US011125938B2

(12) United States Patent
Bookbinder et al.

(10) Patent No.: US 11,125,938 B2
(45) Date of Patent: *Sep. 21, 2021

(54) LOW BEND LOSS OPTICAL FIBER WITH A CHLORINE DOPED CORE AND OFFSET TRENCH

(71) Applicant: Corning Incorporated, Corning, NY (US)

(72) Inventors: Dana Craig Bookbinder, Corning, NY (US); Ming-Jun Li, Horseheads, NY (US); Snigdharaj Kumar Mishra, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,993

(22) Filed: Jan. 14, 2020

(65) Prior Publication Data

US 2020/0150336 A1    May 14, 2020

Related U.S. Application Data

(62) Division of application No. 16/045,188, filed on Jul. 25, 2018, now Pat. No. 10,591,668.

(Continued)

(51) Int. Cl.
*G02B 6/36* (2006.01)
*G02B 6/028* (2006.01)
(Continued)

(52) U.S. Cl.
CPC ....... *G02B 6/0286* (2013.01); *G02B 6/02266* (2013.01); *G02B 6/0365* (2013.01);
(Continued)

(58) Field of Classification Search
CPC .......................... G02B 6/03672; G02B 6/02395
See application file for complete search history.

(56) References Cited

U.S. PATENT DOCUMENTS

| 5,410,567 A | 4/1995 | Brundage et al. |
| 6,027,062 A | 2/2000 | Bacon et al. |

(Continued)

FOREIGN PATENT DOCUMENTS

EP    3121155 A1    1/2017

OTHER PUBLICATIONS

Bookbinder et al; "Low Bend Loss Optical Fiber With a Germania Doped Core"; Filed as U.S. Appl. No. 15/957,414, filed April 19, 2018; 27 Pages 27767.

(Continued)

*Primary Examiner* — Eric Wong
(74) *Attorney, Agent, or Firm* — Robert L. Carlson

(57) ABSTRACT

An optical fiber includes (i) a chlorine doped silica based core having a core alpha (Core$_\alpha$)≥4, a radius $r_1$, and a maximum refractive index delta $\Delta_{1max}$ % and (ii) a cladding surrounding the core. The cladding surrounding the core includes a) a first inner cladding region adjacent to and in contact with the core and having a refractive index delta $\Delta_2$, a radius $r_2$, and a minimum refractive index delta $\Delta_{2min}$ such that $\Delta_{2min} < \Delta_{1max}$, b) a second inner cladding adjacent to and in contact with the first inner cladding having a refractive index $\Delta_3$, a radius $r_3$, and a minimum refractive index delta $\Delta_{3min}$ such that $\Delta_{3min} < \Delta_2$, and c) an outer cladding region surrounding the second inner cladding region and having a refractive index $\Delta_5$, a radius $r_{max}$, and a minimum refractive index delta $\Delta_{3min}$ such that $\Delta_{3min} < \Delta_2$. The optical fiber has a mode field diameter MFD at 1310 of ≥9 microns, a cable cutoff of ≤1260 nm, a zero dispersion wavelength of 1300 nm≤zero dispersion wavelength≤1324 nm, and a mac- (Continued)

robending loss at 1550 nm for a 20 mm mandrel of less than 0.75 dB/turn.

10 Claims, 15 Drawing Sheets

Related U.S. Application Data

(60) Provisional application No. 62/542,518, filed on Aug. 8, 2017.

(51) Int. Cl.
    *G02B 6/036*     (2006.01)
    *G02B 6/02*     (2006.01)

(52) U.S. Cl.
    CPC ..... *G02B 6/03633* (2013.01); *G02B 6/03644* (2013.01); *G02B 6/03672* (2013.01)

(56) References Cited

U.S. PATENT DOCUMENTS

| | | | |
|---|---|---|---|
| 7,565,820 B2 | 7/2009 | Foster et al. | |
| 7,832,675 B2 | 11/2010 | Bumgarner et al. | |
| 8,891,925 B2 | 11/2014 | Bickham et al. | |
| 8,953,917 B2 | 2/2015 | Berkey et al. | |
| 9,580,350 B2 | 2/2017 | Annamalai et al. | |
| 9,618,692 B2 | 4/2017 | Berkey et al. | |
| 2005/0111803 A1* | 5/2005 | Bickham | G02B 6/02276 385/123 |
| 2008/0273849 A1* | 11/2008 | Sanders | G02B 6/03627 385/126 |
| 2010/0002997 A1* | 1/2010 | Gruner-Nielsen | G02B 6/03666 385/95 |
| 2016/0304392 A1 | 10/2016 | Bookbinder et al. | |
| 2017/0075061 A1 | 3/2017 | Bookbinder et al. | |
| 2017/0168231 A1 | 6/2017 | Berkey et al. | |
| 2017/0285260 A1* | 10/2017 | Bookbinder | G02B 6/0365 |
| 2018/0011245 A1* | 1/2018 | Suzuki | G02B 6/0283 |
| 2018/0031761 A1 | 2/2018 | Bookbinder et al. | |
| 2018/0031762 A1* | 2/2018 | Bookbinder | G02B 6/03666 |
| 2018/0321438 A1* | 11/2018 | Bookbinder | G02B 6/02219 |
| 2019/0008607 A1* | 1/2019 | Bauco | A61L 2/10 |

OTHER PUBLICATIONS

NL2019817 Search Report dated Jul. 6, 2018; 9 Pages; European Patent Office.

Single Mode Fiber Optics, Jeunhomme, pp. 39-44, Marcel Dekker, New York, 1990.

\* cited by examiner

LOW BEND LOSS OPTICAL FIBER WITH A CHLORINE DOPED CORE AND OFFSET TRENCH

This application is a divisional and claims the benefit of priority under 35 U.S.C. § 120 of U.S. patent application Ser. No. 16/045,188, filed on Jul. 25, 2018, now U.S. Pat. No. 10,591,668, which claims the benefit of priority under 35 U.S.C. § 119 of U.S. Provisional Application Ser. No. 62/542,518, filed on Aug. 8, 2017 and to Dutch Patent Application No. 2019817, filed on Oct. 27, 2017, the content of which is relied upon and incorporated herein by reference in its entirety.

TECHNICAL FIELD

The present disclosure generally relates to single mode optical fibers having low bend losses, and in particular relates to optical fibers having chlorine doped cores and more particularly to single mode fibers with a chlorine-doped core and a cladding having an offset trench region surrounding the core.

BACKGROUND

There is a need for low bend loss optical fibers, particularly for optical fibers utilized in so-called "access" and fiber to the premises (FTTx) optical networks. Optical fiber can be deployed in such networks in a manner which induces bend losses in optical signals transmitted through the optical fiber. Some applications that can impose physical demands, such as tight bend radii, compression of optical fiber, etc., that induce bend losses include the deployment of optical fiber in optical drop cable assemblies, distribution cables with Factory Installed Termination Systems (FITS) and slack loops, small bend radius multiports located in cabinets that connect feeder and distribution cables, and jumpers in Network Access Points between distribution and drop cables. It has been difficult in some optical fiber designs to simultaneously achieve low macrobending loss, low microbending loss, low cable cutoff wavelength, a zero dispersion wavelength between 1300 nm and 1324 nm, 1310 mode field diameter of 8.2 to 9.6 microns, and ITU G.652/G.657 standards compliance.

SUMMARY

According to another embodiment, a single mode optical fiber is provided. The single mode optical fiber includes (i) a chlorine doped silica based core having a core alpha $(Core_\alpha)>10$, a radius $r_1$, and a maximum refractive index delta $\Delta_{1max}$ % and (ii) a cladding surrounding the core. The cladding surrounding the core includes a) a first inner cladding region adjacent to and in contact with the core and having a refractive index delta $\Delta_2$, a radius $r_2$, and a minimum refractive index delta $\Delta_{2min}$ such that $\Delta_{2min}<\Delta_{1max}$, b) a second inner cladding adjacent to and in contact with the first inner cladding and having a refractive index $\Delta_3$, a radius $r_3$, and a minimum refractive index delta $\Delta_{3min}$ such that $\Delta_{3min}<\Delta_2$, and c) an outer cladding region surrounding the second inner cladding region and having a refractive index $\Delta_5$ and a radius $r_{max}$, such that $\Delta_{3min}<\Delta_2$. The optical fiber has a mode field diameter MFD at 1310 of ≥9 microns, a cable cutoff of ≤1260 nm, a zero dispersion wavelength ranging from 1300 nm≤$\lambda_0$≤1324 nm, and a macrobending loss at 1550 nm for a 20 mm mandrel of less than 0.75 dB/turn.

According to another embodiment, a single mode optical fiber is provided. The single mode optical fiber includes (i) a chlorine doped silica based core having a core alpha $(Core_\alpha)\geq4$, a radius $r_1$, and a maximum refractive index delta $\Delta_{1max}$ % and (ii) a cladding surrounding the core. The cladding surrounding the core includes a) a first inner cladding region adjacent to and in contact with the core and having a refractive index delta $\Delta_2$, a radius $r_2$, and a minimum refractive index delta $\Delta_{2min}$ such that $\Delta_{2min}<\Delta_{1max}$, b) a second inner cladding adjacent to and in contact with the first inner cladding and having a refractive index $\Delta_3$, a radius $r_3$, and a maximum refractive index delta $\Delta_{3max}$ such that $\Delta_{2min}<\Delta_{3max}$, and c) an outer cladding region surrounding the inner cladding region and having a refractive index $\Delta_5$ and a radius $r_{max}$, such that $\Delta_5<\Delta_{3max}$. The optical fiber has a mode field diameter MFD at 1310 of ≥9 microns, a cable cutoff of ≤1260 nm, a zero dispersion wavelength ranging from 1300 nm≤$\lambda_0$≤1324 nm, and a macrobending loss at 1550 nm for a 20 mm mandrel of less than 0.75 dB/turn.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
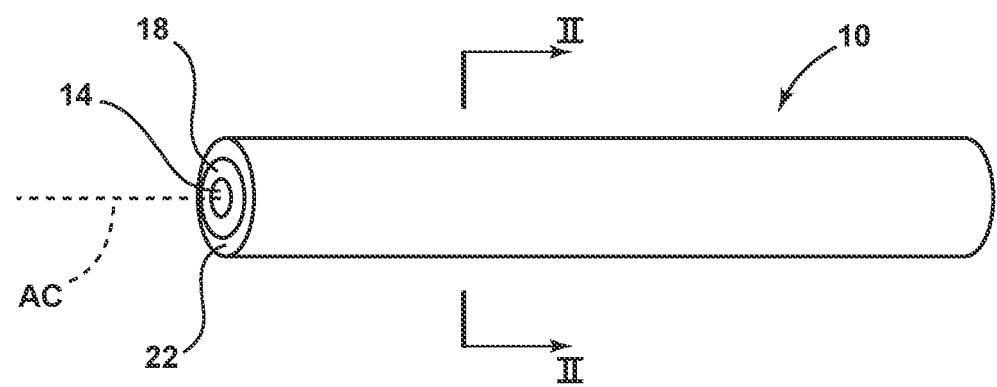
FIG. 1 is a side perspective view of an optical fiber according to one embodiment of the present disclosure.

Additional features and advantages will be set forth in the detailed description which follows and will be apparent to those skilled in the art from the description or recognized by practicing as described in the following description together with the claims and appended drawings.

Low attenuation is a critical property in optical fibers. Optical fibers disclosed herein are valuable for use as low attenuation optical fibers such as in optical fiber cables for submarine and terrestrial long haul systems.

The "refractive index profile" is the relationship between refractive index or relative refractive index (also referred to as refractive index delta herein) and waveguide fiber radius. The radius for each segment of the refractive index profile is given by the abbreviations $r_1$, $r_2$, $r_3$, $r_4$, etc. and lower and upper case are used interchangeably herein (e.g., $r_1$ is equivalent to $R_1$).

Unless stated otherwise, the "relative refractive index percent" is defined as $\Delta\% = 100 \times (n_i^2 - n_c^2)/2n_i^2$, and as used herein $n_c$ is the average refractive index of undoped silica glass. As used herein, the relative refractive index is represented by $\Delta$ and its values are given in units of "%", unless otherwise specified. The terms: relative refractive index percent, relative refractive index, refractive index delta, refractive index, relative refractive index delta, delta, $\Delta$, $\Delta$ %, % $\Delta$, delta %, % delta and percent delta may be used interchangeably herein. In cases where the refractive index of a region is less than the average refractive index of undoped silica, the relative index percent is negative and is referred to as having a depressed region or depressed index. In cases where the refractive index of a region is greater than the average refractive index of the cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, and/or Br. Examples of downdopants include fluorine and $B_2O_3$. As described herein, while the relative refractive index of the optical profiles are calculated where index of $n_c$ is undoped silica, the entire index profile of the optical fiber can be shifted linearly up (or down) in order to obtain equivalent optical fiber properties.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers, the inter-modal dispersion is zero. Zero dispersion wavelength is a wavelength at which the dispersion has a value of zero. Dispersion slope is the rate of change of dispersion with respect to wavelength.

"Effective area" is defined in equation 1 as:

$$A_{eff} = 2\pi (\int f^2 r \, dr)^2 / (\int f^4 r \, dr) \qquad \text{Eq. 1}$$

where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "α-core profile", refers to a relative refractive index profile of the core, expressed in terms of $\Delta(r)$ which is in units of "%", where r is radius, which follows the equation (Eq. 2), $$\Delta(r) = \Delta(r_o)(1 - [|r - r_o|/(r_1 - r_o)]^{\alpha core}) \qquad \text{Eq. 2}$$

where $r_o$ is the point at which $\Delta(r)$ is maximum and is the initial point of the α-core profile, $r_1$ is the outer radius of the core and corresponds to the final point of the core's α-profile, it is defined as where a tangent line drawn through maximum slope of the refractive index of core crosses the zero delta line (i.e., the point at which $\Delta(r)$ % is zero), and r is in the range $r_i < r < r_f$, where $\Delta$ is defined above, $r_o$ corresponds to the initial point of the core's α-profile, $r_1$ corresponds to the final point of the α-profile, $Core_\alpha$, and $\alpha_{core}$ (also referred to herein as "core alpha") is an exponent which is a real number. In some embodiments, the core alpha is $1 \leq \alpha_{core} \leq 100$. In other embodiments, the core alpha is $4 \leq \alpha_{core} \leq 30$. In the discussion below, example values of $\alpha_{core}$ are provided for at least some of the embodiments described herein.

The term "α-profile of the inner cladding," also referred herein as the alpha$_{pedestal}$ or $\alpha_{ped}$, refers to a relative refractive index profile of the inner cladding region, expressed in terms of $\Delta(r)$ which is in units of "%", where r is radius, which follows the equation (Eq. 3), $$\Delta(r) = \Delta(r_2) + (\Delta(r_1) - \Delta(r_2))(1 - [|r - r_1|/(r_2 - r_1)]^{\alpha ped}) \qquad \text{Eq. 3}$$

where $r_1$ is defined as above, and is typically the point at which $\Delta(r)$ of the inner cladding region is maximum, $r_2$ is the outer radius of the inner cladding and corresponds to a point at which a (vertical) line drawn through refractive index profile of inner cladding associated with its minimum refractive index crosses the zero delta line (i.e., the point at which $\Delta(r)$ % is zero), and r is in the range $r_i \leq r \leq r_f$, where $\Delta$ is defined above, $r_i$ is the initial point of the α-profile of the inner cladding region, $r_f$ is the final point of the α-profile of the inner cladding region, and $\alpha_{ped}$ is an exponent which is a real number (also referred to as an inner cladding alpha herein). In some embodiments, the pedestal alpha is $1 \leq \alpha_{ped} \leq 100$. In some embodiments, the pedestal alpha is $5 \leq \alpha_{ped} \leq 20$.

The term "α-profile of the trench", also referred herein as the alpha$_{trench}$ or $\alpha_T$, refers to a relative refractive index profile of the inner cladding region, expressed in terms of $\Delta(r)$ which is in units of "%", where r is radius, which follows the equation (Eq. 4), $$\Delta(r) = \Delta(r_3) + (\Delta(r_2) - \Delta(r_3))(1 - [|r - r_2|/(r_3 - r_2)]^{\alpha T}) \qquad \text{Eq. 4}$$

where $r_1$ is defined as above, and is typically the point at which $\Delta(r)$ of the trench region is maximum, $r_3$ is the outer radius of the inner cladding and corresponds to a point at which a (vertical) line drawn through refractive index profile of trench associated with its minimum refractive index crosses the zero delta line (i.e., the point at which $\Delta(r)$ % is zero), and r is in the range $r_i \leq r \leq r_f$, where $\Delta$ is defined above, $r_i$ is the initial point of the α-profile of the trench region, $r_f$ is the final point of the α-profile of the trench region, and $\alpha_T$ is an exponent which is a real number (also referred to as a trench alpha herein). In some embodiments, the trench alpha is $1 \leq \alpha_T \leq 100$. In some embodiments, the pedestal alpha is $5 \leq \alpha_T \leq 20$.

The term "trench" as used herein, refers to a cladding region that has a variable refractive index with a minimum refractive index at $\Delta_{3max}$ that is lower than that of the adjacent cladding regions that are in contact therewith. The trench volume $V_T$ is defined herein in equation 5 as:

$$V_{trench} \equiv 2 \int_{r_2}^{r_3} \Delta_{5-3}(r) r \, dr \qquad \text{Eq. 5}$$

wherein $\Delta_{5-3}(r)$ is $\Delta_5 - \Delta_3(r)$ for a given radial position r situated between the radial positions of $r_2$ and $r_3$, and wherein $r_2$ is the radial position where the refractive index in the trench cladding region, moving radially outward from centerline, is first equal to the refractive index of the outer cladding region. Trench volumes are reported in absolute value in units of % delta·microns². In some embodiments, the trench volumes are 0.4% delta·microns²≤$V_{trench}$≤15% delta·microns². In other embodiments, the trench volumes are 0.3% delta·microns²≤$V_{trench}$≤5% delta·microns².

The term "pedestal" as used herein, refers to a cladding region that has a refractive index $\Delta_2$ that is higher than that of the refractive index $\Delta_5$ cladding region that is in contact therewith. The ring volume $V_{pedestal}$ is defined herein in equation 6 as:

$$V_{pedestal} \equiv 2 \int_{r_1}^{r_2} \Delta_{5-2}(r) r dr \qquad \text{Eq. 6}$$

wherein $\Delta_{5-2}(r)$ is $\Delta_5-\Delta_2(r)$ for a given radial position r situated between the radial positions of $r_1$ and $r_2$, and wherein $r_2$ is the radial position where the refractive index in the pedestal cladding region, moving radially outward from centerline, is first equal to the refractive index of the outer cladding region. Pedestal volumes are reported in absolute value in units of % delta·microns². In some embodiments, the pedestal volumes are 1% delta·microns²≤$V_{pedestal}$≤15% delta·microns². In other embodiments, the pedestal volumes are 2% delta·microns²≤$V_{pedestal}$≤6% delta·microns².

The mode field diameter (MFD) is measured using the Peterman II method wherein, 2 w=MFD, and w²=(2∫f² r dr/∫[df/dr]² r dr), the integral limits being 0 to ∞.

The term "ring" as used herein, refers to a cladding region that has a variable refractive index with a maximum refractive index at $\Delta_{3max}$ that is higher than that of the adjacent cladding regions that are in contact therewith.

The term "ring entry α-profile," also referred to herein as the alpha$_{ring-entry}$ or $\alpha_{ring-ent}$, refers to a relative refractive index profile of the inner cladding region, expressed in terms of Δ(r) which is in units of "%", where r is radius, which follows the equation (Eq. 7), $$\Delta(r)=\Delta(r_2)+(\Delta(r_1)-\Delta(r_2))(1-[|r-r_1|/(r_2-r_1)]^{\alpha_{ring-ent}}) \qquad \text{Eq. 7}$$

where $r_1$ is defined as above, and is typically the point at which Δ(r) of the inner cladding region is maximum, $r_2$ is the outer radius of the inner cladding and corresponds to a point at which a (vertical) line drawn through refractive index profile of inner cladding associated with its minimum refractive index crosses the zero delta line (i.e., the point at which Δ(r) % is zero), and r is in the range $r_1 \leq r \leq r_f$, where Δ is defined above, $r_i$ is the initial point of the α-profile of the inner cladding region, $r_f$ is the final point of the α-profile of the inner cladding region, and $\alpha_{ring-ent}$ is an exponent which is a real number (also referred to as a ring entry alpha herein). In some embodiments, the ring entry alpha is 1≤$\alpha_{ring-ent}$≤100. In some embodiments, the ring entry alpha is 5≤$\alpha_{ring-ent}$≤30. In the other embodiments herein, (e.g., FIG. 4 and Table 2), the ring alpha can also be referred to as $\alpha_{3a}$.

The term "ring exit α-profile," also referred to herein as the alpha$_{ring-exit}$ or $\alpha_{ring-ex}$, refers to a relative refractive index profile of the inner cladding region, expressed in terms of Δ(r) which is in units of "%", where r is radius, which follows the equation (Eq. 8), $$\Delta(r)=\Delta(r_2)+(\Delta(r_2)-\Delta(r_3))(1-[|r-r_2|/(r-r_3)]^{\alpha_{ring-ex}}) \qquad \text{Eq. 8}$$

where $r_2$ is defined as above, and is typically the point at which Δ(r) of the ring region is maximum, $r_3$ is the outer radius of the ring and corresponds to a point at which a (vertical) line drawn through refractive index profile of ring associated with its minimum refractive index crosses the zero delta line (i.e., the point at which Δ(r) % is zero), and r is in the range $r_1 \leq r \leq r_f$, where Δ is defined above, $r_i$ is the initial point of the α-profile of the ring region, $r_f$ is the final point of the α-profile of the ring region, and $\alpha_{ring-ex}$ is an exponent which is a real number (also referred to as a ring exit alpha herein). In some embodiments, the ring exit alpha is 1≤$\alpha_{ring-exit}$≤100. In some embodiments, the ring exit alpha is 5≤$\alpha_{ring-exit}$≤30. In the embodiments herein, (e.g., FIG. 4 and Table 2), the ring exit alpha can also be referred to as $\alpha_{3b}$.

The terms "μm" and "microns" can be used interchangeably herein.

The bend resistance of a waveguide fiber can be gauged by induced attenuation under prescribed test conditions, for example by deploying or wrapping the fiber around a mandrel of a prescribed diameter, e.g., by wrapping 1 turn around either a 6 mm, 10 mm, or 20 mm or similar diameter mandrel (e.g. "1×10 mm diameter macrobend loss" or the "1×20 mm diameter macrobend loss") and measuring the increase in attenuation per turn.

One type of bend test is the lateral load microbend test. In this so-called "lateral load" test (LLWM), a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 Newtons. A 70 Newton force is then applied to the plates and the increase in attenuation in dB/m is measured. The increase in attenuation is the lateral load attenuation of the waveguide in dB/m at a specified wavelength (typically within the range of 1200 nm-1700 nm, e.g., 1310 nm or 1550 nm or 1625 nm).

Another type of bend test is the wire mesh covered drum microbend loss test (WMCD). In this test, a 400 mm diameter aluminum drum is wrapped with wire mesh. The mesh is wrapped tightly without stretching, and should have no holes, dips, or damage. Wire mesh material specification: McMaster-Carr Supply Company (Cleveland, Ohio), part number 85385T106, corrosion-resistant type 304 stainless steel woven wire cloth, mesh per linear inch: 165×165, wire diameter: 0.0019", width opening: 0.0041", open area %: 44.0. A prescribed length (750 meters) of waveguide fiber is wound at 1 m/s on the wire mesh drum at 0.050 centimeter take-up pitch while applying 80 (+/−1) grams tension. The ends of the prescribed length of fiber are taped to maintain tension and there are no fiber crossovers. The attenuation of the optical fiber is measured at a specified wavelength (typically within the range of 1200-1700 nm, e.g., 1310 nm or 1550 nm or 1625 nm); a reference attenuation is measured on the optical fiber wound on a smooth drum. The increase in attenuation is the wire mesh covered drum attenuation of the waveguide in dB/km at a specified wavelength (typically within the range of 1200-1700 nm, e.g., 1310 nm or 1550 nm or 1625 nm).

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm.

During testing, sufficient tension is applied to make the waveguide fiber conform to a portion of the pin surface. The increase in attenuation is the pin array attenuation in dB of the waveguide at a specified wavelength (typically within the range of 1200-1700 nm, e.g., 1310 nm or 1550 nm or 1625 nm).

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards.

The ratio of MFD at 1310 nm to Cable Cutoff wavelength (MFD at 1310 nm/Cable Cutoff wavelength in microns) is defined herein as MACC.

Unless otherwise noted herein, optical properties (such as dispersion, dispersion slope, etc.) are reported for the LP01 mode.

Referring now to FIG. 1, a side view of a single mode optical fiber 10 is provided. The optical fiber 10 has a centerline AC and a radial coordinate r. The optical fiber 10 has a chlorine doped silica central core 14 of radius $r_1$ surrounded by a cladding 18 having a maximum radius $r_4$. In some embodiments, the optical fiber 10 includes an undoped silica layer 22 that surrounds the cladding 18, and having a maximum radius $r_{max}$.

The core 14 has a core alpha profile ($Core_\alpha$) where $1 \leq Core_\alpha \leq 100$ and a maximum relative refractive index delta $\Delta_{1max}$, where some embodiments are in the following ranges: $0.10\% \leq \Delta_{1max} \leq 0.45\%$, $0.13\% \leq \Delta_{1max} \leq 0.39\%$, $0.14\% \leq \Delta_{1max} \leq 0.37\%$, $0.10\% \leq \Delta_{1max} \leq 0.40\%$, or $0.13\% \leq \Delta_{1max} \leq 0.36\%$. In some embodiments, the core 14 has a radius $r_1$ in the range 3.5 microns $\leq r_1 \leq 5.5$ microns, 3.6 microns $\leq r_1 \leq 4.5$ microns, or $3.7 \leq r_1 \leq 4.3$.

The core 14 can be made from silica doped with chlorine (Cl) at a Cl concentration, [Cl], $\geq 1.5$ wt %. In some embodiments, the Cl concentration in the core may be $\geq 2.0$ wt %. In other embodiments, the Cl concentration in the core may be $\geq 2.5$ wt %. In still other embodiments, the Cl concentration may be $\geq 3.0$ wt %. In some embodiments, the Cl concentration in the core may be $\geq 3.5$ wt %, $\geq 4.0$ wt %, $\geq 4.5$ wt %, or $\geq 5.5$ wt %. In other embodiments, the Cl concentration in the core may be 1.5 wt % $\leq [Cl] \leq 8.5$ wt %. In still other embodiments, the Cl concentration in the core may be 1.5 wt % $\leq [Cl] \leq 5.5$ wt %. In yet other embodiments, the Cl concentration in the core may be 2.0 wt % $\leq [Cl]$ 5.5 wt %. The single mode optical fiber 10 can include the chlorine doped silica central core 14 region where the core alpha profile ($Core_\alpha$) is $1 \leq Core_\alpha \leq 100$, $1 \leq Core_\alpha \leq 10$, $4 \leq Core_\alpha \leq 30$, or $10 \leq Core_\alpha \leq 30$. In some embodiments, the core alpha profile ($Core_\alpha$) is $\geq 10$, $\geq 15$, $\geq 20$, or $\geq 25$.

In some embodiments, the optical fiber 10 may have a mode field diameter (MFD) at 1310 nm of $\geq 9$ microns and in other embodiments can be in the range of 9 microns $\leq MFD \leq 9.5$ microns. In some embodiments, the optical fiber 10 exhibits a mode field diameter at 1310 nm of 8.2 microns $\leq MDF_{1310\ nm} \leq 9.6$ microns or $9.0 \leq MDF_{1310\ nm} \leq 9.6$.

In some embodiments, the optical fiber 10 may have a 22 m cable cutoff less than or equal to 1260 nm, a macrobending loss at 1550 nm of $\leq 0.75$ dB/turn on a 20 mm diameter mandrel, may exhibit a MACC number between 6.6 and 8.3, and a zero dispersion wavelength, $\lambda_0$ ranging 1300 nm $\leq \lambda_0 \leq 1324$ nm. In other embodiments, the optical fiber 10 may have a 22 m cable cutoff less than or equal to 1260 nm, a macrobending loss at 1550 nm of $\leq 0.70$ dB/turn on a 20 mm diameter mandrel, may exhibit a MACC number between 7.1 and 8.1, a zero dispersion wavelength, $\lambda_0$ ranging 1300 nm $\leq \lambda_0 \leq 1324$ nm, and may exhibit a mode field diameter at 1310 nm of 8.2 microns $\leq MDF_{1310\ nm} \leq 9.6$ microns.

In some embodiments, the optical fiber 10 has a macrobending loss at 1550 nm of $\leq 0.5$ dB/turn on a 20 mm diameter mandrel. In other embodiments, the optical fiber 10 has a macrobending loss at 1550 nm of $\leq 0.05$ dB/turn on a 30 mm diameter mandrel. In still other embodiments, the optical fiber 10 has a macrobending loss at 1550 nm of $\leq 0.005$ dB/turn on a 30 mm diameter mandrel.

The optical fiber 10 may have an outer radius for cladding 18 of about $r_{max} = 62.5$ microns. In some embodiments, the optical fiber 10 may have an outer radius for cladding 18 of $r_{max} = 62.5$ microns.

The optical fibers shown herein meet ITU G.652 and G.657A optical performance properties, and can demonstrate or yield very low macrobend and microbending losses in addition to a very low attenuation at 1310 and 1550 nm.

The optical fiber 10 may have a number of additional features as set forth in the embodiments discussed below.

Pedestal and Trench Embodiments

Figure 2:
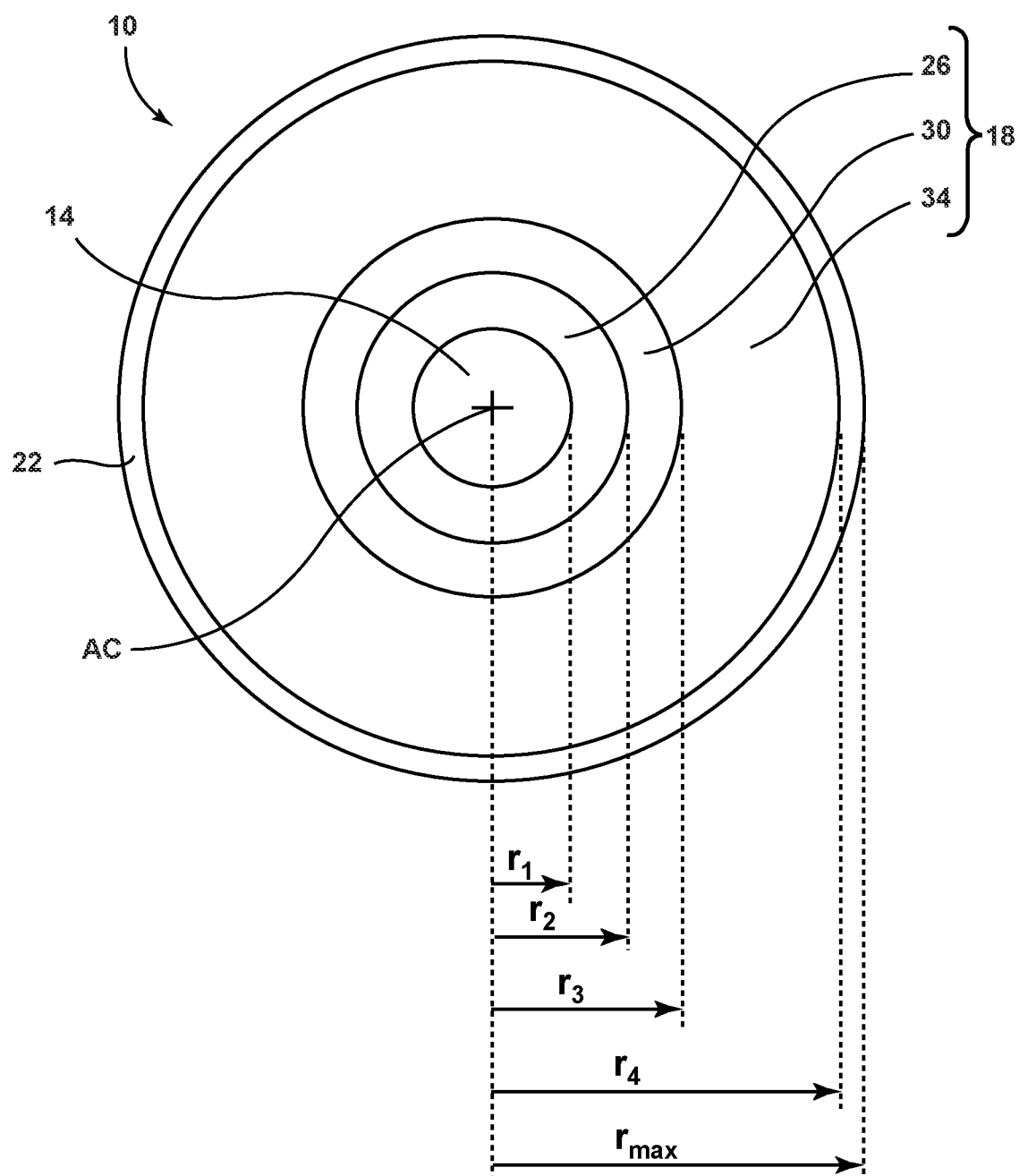
FIG. 2 is a cross-sectional view of the optical fiber taken through line II-II of FIG. 1 according to one embodiment of the present disclosure.

Referring now to FIG. 2, a schematic cross-sectional diagram of the optical fiber 10 is shown according to some embodiments of the present disclosure. The single mode optical fiber 10 may include: (i) the chlorine doped silica based core 14 comprising the core alpha ($Core_\alpha$) $\geq 4$, the radius $r_1$ and the maximum refractive index delta $\Delta_{1max}$ % and (ii) the cladding 18 surrounding the core 14. The cladding 18 surrounding the core 14 includes a) a pedestal layer 26 adjacent to and in contact with the core 14 and having a refractive index delta $\Delta_2$, a radius $r_2$, and a minimum refractive index delta $\Delta_{2min}$ such that $\Delta_{2min} < \Delta_{1max}$, b) an inner cladding layer 30 or trench layer 30a adjacent to and in contact with the first inner cladding 26 having a refractive index $\Delta_3$, a radius $r_3$, and a minimum refractive index delta $\Delta_{3min}$ such that $\Delta_{3min} < \Delta_2$, and c) an outer cladding 34 adjacent to and in contact with the first inner cladding 30 having a refractive index $\Delta_5$ and a radius $r_4$ (which in this case is $r_{max}$), such that $\Delta_{3min} < \Delta_2$. The optical fiber 10 has a mode field diameter MFD at 1310 of $\geq 9$ microns, a cable cutoff of $\leq 1260$ nm, a zero dispersion wavelength ranging from 1300 nm $\leq \lambda_0 \leq 1324$ nm, and a macrobending loss at 1550 nm for a 20 mm mandrel of less than 0.5 dB/turn.

Still referring now to FIG. 2, another aspect of the schematic cross-sectional diagram of the single mode optical fiber 10 is shown according to additional embodiments of the present disclosure. The single mode optical fiber 10 may include (i) the chlorine doped silica central core region 14 having comprising a core alpha (Core$_\alpha$)≥4, a radius $r_1$ and a maximum refractive index delta $\Delta_{1max}$ %; (ii) the cladding 18 surrounding the core 14, the cladding 18 including: a) the pedestal layer 26 adjacent to and in contact with the core 14 and having a refractive index delta $\Delta_2$, a radius $r_2$, and a minimum refractive index delta $\Delta_{2min}$ such that $\Delta_{2min} < \Delta_{1max}$; b) the inner cladding 30 or trench layer 30$a$ adjacent to and in contact with the pedestal layer 26 having a refractive index $\Delta_3$, a radius $r_3$, and a maximum refractive index delta $\Delta_{3max}$ such that $\Delta_{2min} < \Delta_{3max}$; and c) an outer cladding region 34 surrounding the inner cladding region 30 or trench layer 30$a$ and having a refractive index $\Delta_5$ and a radius $r_4$ (which in this case is $r_{max}$), such that $\Delta_5 < \Delta_{3max}$; wherein the optical fiber has a mode field diameter MFD at 1310 of ≥9 microns, a cable cutoff of ≤1260 nm, a zero dispersion wavelength ranging from 1300 nm≤$\lambda_0$≤1324 nm, and a macrobending loss at 1550 nm for a 20 mm mandrel of less than 0.75 dB/turn.

Figure 3A:
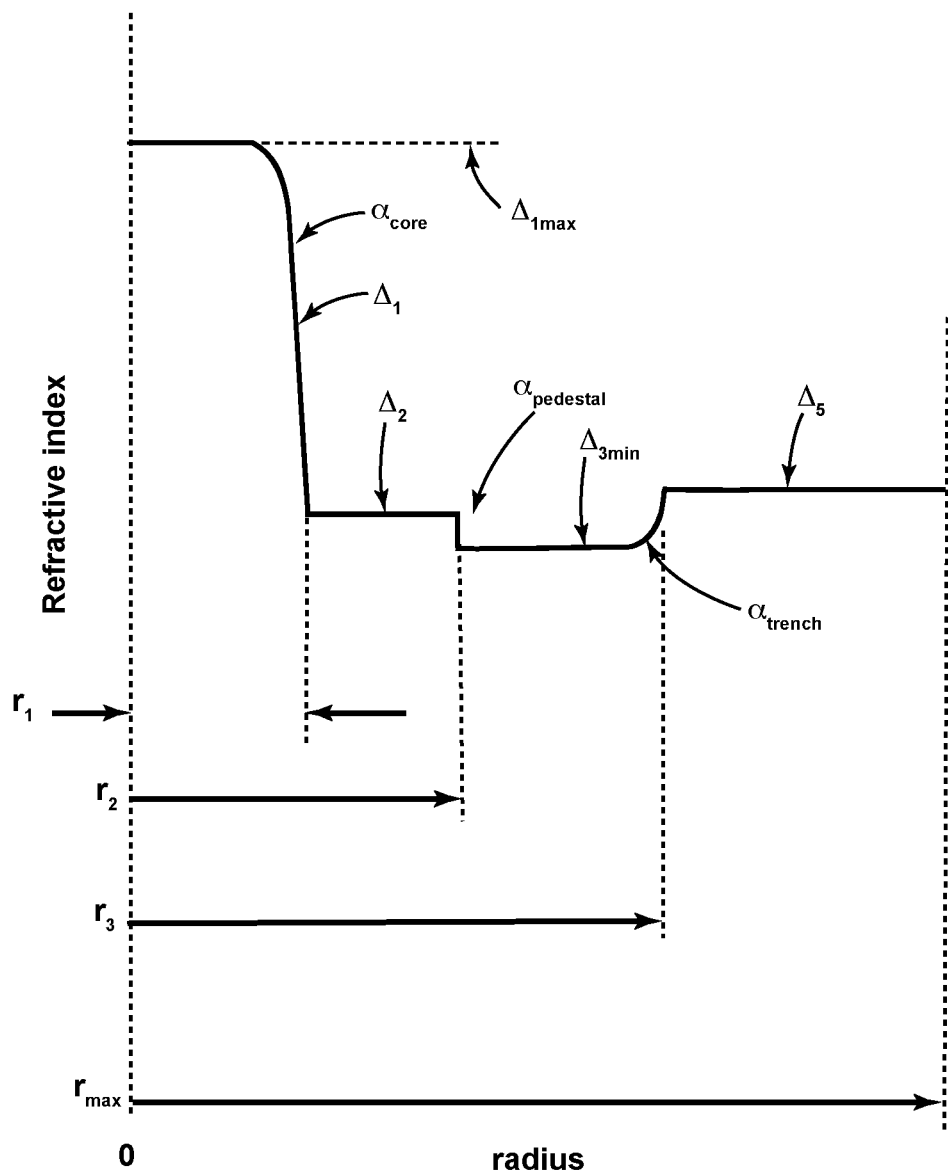
FIG. 3A is a plot of the relative refractive index profile Δ versus the radius of the optical fiber of FIG. 2.

Referring now to FIG. 3A, a plot of the relative refractive index profile ("index profile") Δ versus radius r for the optical fiber 10 represented in FIG. 2. The cladding 18 of the pedestal and trench embodiments of optical fiber 10 may include two regions that progress outwardly from the core 14 in the following order: the pedestal layer 26 surrounding the core 14 having the radius $r_2$ and the refractive index $\Delta_2$; the inner cladding layer 30 or trench layer 30$a$ having the radius $r_3$ and the refractive index $D_3$; and the outer cladding layer 34 having the radius $r_4$ (and in this case which is equal to $r_{max}$) and having the refractive index $\Delta_5$. The respective refractive indexes of the core 14 and cladding 18 are $\Delta_{1max} \geq \Delta_5 \geq \Delta_2 \geq \Delta_{3min}$.

Figure 3B:
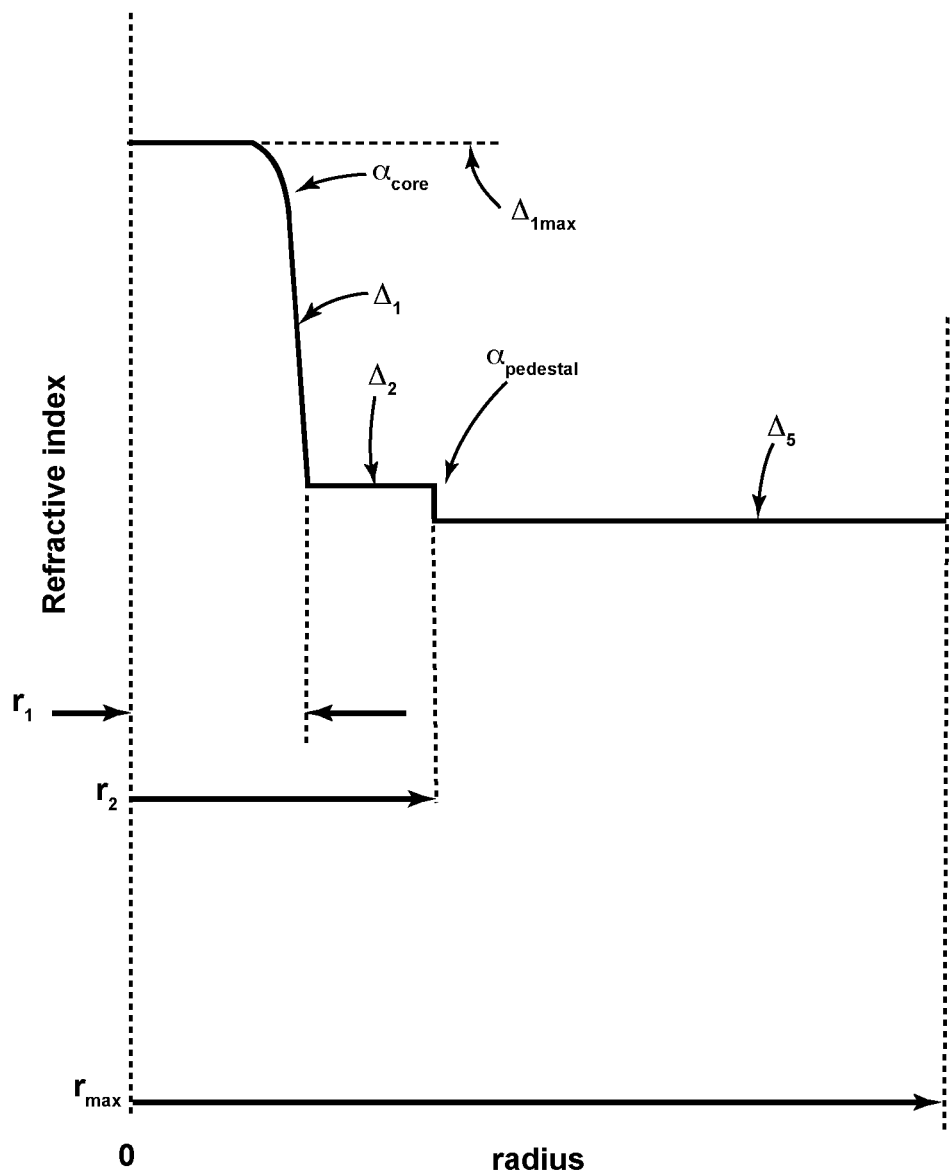
FIG. 3B is a plot of the relative refractive index profile Δ versus the radius of the optical fiber according to some embodiments of the present disclosure.

Referring now to FIG. 3B, an index profile Δ versus radius r for some embodiments of the optical fiber 10 is represented. The cladding 18 of the pedestal embodiments of optical fiber 10 may include two regions that progress outwardly from the core 14 having the radius $r_1$, refractive index $\Delta_2$; and the refractive index $\Delta_{1max}$ in the following order: the pedestal layer 26 surrounding the core 14 having the radius $r_2$, the refractive index $\Delta_2$, and the alpha pedestal $\alpha_{pedestal}$; and the outer cladding layer 34 having a radius $r_4$ (and in this case which is equal to $r_{max}$) and having a refractive index $\Delta_5$. The respective refractive indexes of the core 14 and cladding 18 are $\Delta_{1max} \geq \Delta_2 \geq \Delta_5$.

Figure 4:
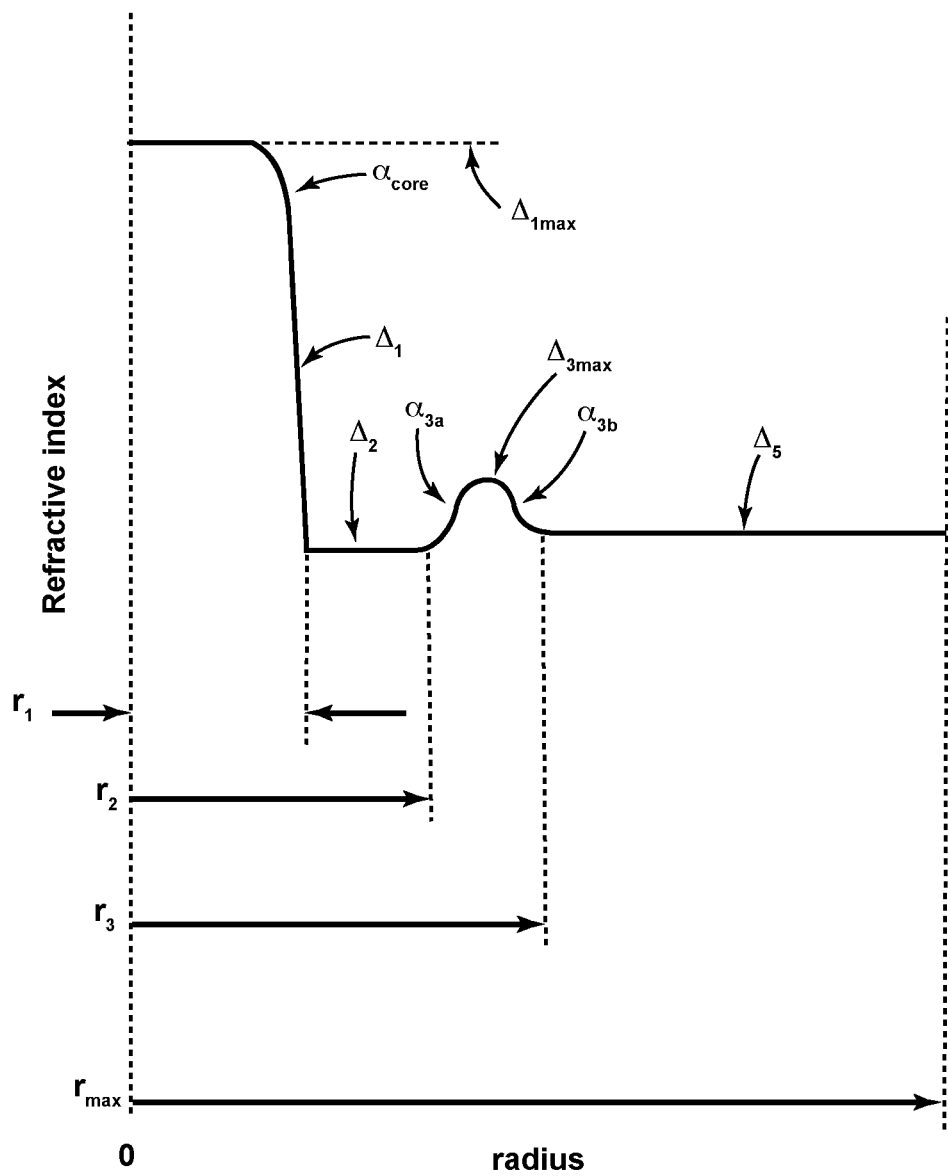
FIG. 4 is a plot of the relative refractive index profile Δ versus the radius of the optical fiber according to some embodiments of the present disclosure.

Referring now to FIG. 4, an index profile Δ versus radius r for some embodiments of the optical fiber 10 is represented. The cladding 18 of the pedestal embodiments of optical fiber 10 may include two regions that progress outwardly from the core 14 having the radius $r_1$, refractive index $\Delta_1$, and the refractive index $\Delta_{1max}$ in the following order: the pedestal layer 26 surrounding the core 14 having the radius $r_2$ and the refractive index $\Delta_2$; the inner cladding layer 30 or ring layer 30$b$ having the radius $r_3$, a ring entry alpha $\alpha_{3a}$, a ring exit alpha $\alpha_{3b}$, and the refractive index $\Delta_{3max}$; and the outer cladding layer 34 having the radius $r_4$ (and in this case which is equal to $r_{max}$) and having the refractive index $\Delta_5$. The respective refractive indexes of the core 14 and cladding 18 are $\Delta_{1max} \geq \Delta_{3max} \geq \Delta_5 \geq \Delta_2$.

In some embodiments, the pedestal layer 26 can be made from silica doped with chlorine (Cl) at a Cl concentration, [Cl], ≥0.2 wt %. In some embodiments, the Cl concentration in the pedestal may be ≥0.4 wt %. In other embodiments, the Cl concentration in the pedestal may be ≥0.5 wt %. In still other embodiments, the Cl concentration in the pedestal may be ≥0.7 wt %. In still more embodiments, the Cl concentration in the pedestal may be ≥1.0 wt %. In other embodiments, the Cl concentration in the pedestal may be 0.2 wt %≤[Cl]≤1.5 wt %. In some embodiments, the Cl concentration in the pedestal may be 0.5 wt %≤[Cl]≤1.5 wt %. In other embodiments, the pedestal layer 26 can be made from silica doped with fluorine (F) at a F concentration, [F], ≥0.2 wt %. In some embodiments, the F concentration in the pedestal may be ≥0.5 wt %, ≥0.7 wt %, or ≥1 wt %.

Adjacent cladding regions are coupled with one another while the pedestal layer 26 is in contact and coupled with the core 14. Inner cladding or trench layer 30$a$ can be positioned outside and in contact with the pedestal layer 26. The outer cladding layer 34 can be positioned outside and in contact with inner cladding or trench layer 30$a$. In some embodiments, outer cladding layer 34 can be adjacent to and in contact with the outermost layer 22 of undoped silica.

In some embodiments, the inner cladding or trench layer 30$a$ can be made from undoped silica or silica doped with chlorine (Cl) at a Cl concentration, [Cl], ≥0.1 wt %. In other embodiments, the Cl concentration in the inner cladding or trench layer 30$a$ may be ≥0.4 wt %. In still other embodiments, the Cl concentration in the inner cladding or trench layer may be 0 wt %≤[Cl]≤1.5 wt %. In some embodiments, the inner cladding or trench layer 30$a$ can be made from silica doped with fluorine (F) at a F concentration, [F], ≥0.2 wt %. In other embodiments, the F concentration in the pedestal may be ≥0.5 wt %, ≥0.7 wt %, or ≥1 wt %. In still other embodiments, the F concentration in the inner cladding or trench layer 30$a$ may be 0 wt %≤[F]≤1.5 wt %.

In some embodiments, the outer cladding layer 34 can be made from undoped silica or silica doped with chlorine (Cl) at a chlorine concentration, [Cl], ≥0.1 wt %. In other embodiments, the Cl concentration in the outer cladding layer 34 may be ≥0.4 wt %. In still other embodiments, the Cl concentration in the outer cladding layer 34 may be 0 wt %≤[Cl]≤1.5 wt %. In some embodiments, the outer cladding layer 34 can be made from silica doped with fluorine (F) at a F concentration, [F], ≥0.2 wt %. In other embodiments, the F concentration in the pedestal may be ≥0.5 wt %, ≥0.7 wt %, or ≥1 wt %. In some embodiments, the F concentration in the outer cladding layer 34 may be 0 wt %≤[F] 1.5 wt %.

In some embodiments, the chlorine concentration in the core 14 in wt %, $[Cl]_{core}$, to the fluorine concentration in the pedestal wt %, $[F]_{pedestal}$, is greater than or equal to 1, i.e., $([Cl]_{core}/[F]_{pedestal}) \geq 1$. In some embodiments, $([Cl]_{core}/[F]_{pedestal}) \geq 2$. In other embodiments, $([Cl]_{core}/[F]_{pedestal}) \geq 10$.

In some embodiments, the chlorine concentration in the core 14 wt %, $[Cl]_{core}$, to the fluorine concentration in the trench in wt %, $[F]_{trench}$, is greater than or equal to 1, i.e., $([Cl]_{core}/[F]_{trench}) \geq 1$. In some embodiments, $([Cl]_{core}/[F]_{trench}) \geq 2$. In other embodiments, $([Cl]_{core}/[F]_{trench}) \geq 10$.

Table 1 below sets forth eight examples (Ex. 1.1 through Ex. 1.8) of the Pedestal and Trench Embodiments used in the optical fiber 10 where the core dopant is chlorine and the pedestal dopant is at least one of chlorine or fluorine. In some embodiments, the outer clad dopant (referred to in Table 1 as $\Delta_5$) is chlorine. The term "na" refers to "not applicable." The term "Attn" refers to attenuation.

TABLE 1

| Parameter | Ex. 1.1 | Ex. 1.2 | Ex. 1.3 | Ex. 1.4 | Ex. 1.5 | Ex. 1.6 | Ex. 1.7 | Ex. 1.8 |
|---|---|---|---|---|---|---|---|---|
| Core, $\Delta_{1max}$, % | 0.15 | 0.15 | 0.36 | 0.37 | 0.375 | 0.373 | 0.38 | 0.362 |
| $r_1$, microns | 4.20 | 4.00 | 4.25 | 4.50 | 4.46 | 4.65 | 4.55 | 4.0 |
| Core alpha, $\alpha_{core}$ | 20 | 100 | 10 | 6.7 | 6.0 | 4.5 | 10 | 100 |
| Core dopant | Cl | Cl | Cl | Cl | Cl | Cl | Cl | Cl |
| $\Delta_2$, % | −0.18 | −0.13 | 0.087 | 0.087 | 0.10 | 0.087 | 0.10 | 0.10 |
| $r_2$, microns | 10.0 | 6.5 | 5.85 | 5.79 | 5.73 | 5.85 | 6.20 | 5.70 |
| Pedestal alpha | 20 | 20 | 20 | 20 | 20 | 20 | 20 | 20 |
| Pedestal dopant | F | F | Cl | Cl | Cl | Cl | Cl | Cl |
| Pedestal volume, % delta · microns$^2$ | 2.5 | 1.8 | 1.4 | 1.2 | 1.3 | 1.1 | 1.2 | 1.6 |
| $\Delta_{3min}$, % | −0.23 | −0.23 | 0.00 | 0.00 | 0.00 | 0.00 | 0.00 | 0.00 |
| $r_3$, microns | 20 | 15 | na | na | na | na | 15 | na |
| Trench alpha | 20 | 20 | na | na | na | na | 20 | na |
| Trench volume, % delta · microns$^2$ | 6.0 | 5.5 | na | na | na | na | 5.6 | na |
| $\Delta_5$, % | −0.21 | −0.20 | 0.00 | 0.00 | 0.00 | 0.00 | 0.03 | 0.00 |
| $\Delta_5$ dopant | F | F | na | na | na | na | Cl | na |
| $r_{max}$, microns | 62.5 | 62.5 | 62.5 | 62.5 | 62.5 | 62.5 | 62.5 | 62.5 |
| Dispersion at 1310 nm (ps/nm/km) | 0.37 | 0.20 | −0.12 | 0.14 | 0.03 | −0.13 | 0.32 | 0.31 |
| Dispersion Slope at 1310 nm, (ps/nm$^2$/km) | 0.085 | 0.089 | 0.088 | 0.088 | 0.088 | 0.088 | 0.089 | 0.088 |
| Dispersion at 1550 nm, (ps/nm/km) | 16.7 | 17.5 | 17.0 | 17.2 | 17.2 | 17.1 | 17.6 | 17.4 |
| Dispersion at Slope 1550 nm, (ps/nm$^2$/km) | 0.059 | 0.060 | 0.059 | 0.059 | 0.060 | 0.060 | 0.060 | 0.059 |
| MFD at 1310 nm, microns | 9.09 | 9.18 | 9.18 | 9.16 | 9.14 | 9.20 | 9.18 | 9.19 |
| MFD at 1550 nm, microns | 10.4 | 10.4 | 10.4 | 10.4 | 10.4 | 10.5 | 10.3 | 10.4 |
| LLWM @ 1550 nm, dB/m | 0.362 | 0.40 | 0.45 | 0.33 | 0.32 | 0.42 | 0.43 | 0.33 |
| WMCD at 1550 nm, dB/km | <0.05 | <0.05 | <0.05 | <0.05 | <0.05 | <0.05 | <0.05 | <0.06 |
| Pin Array at 1550 nm, dB | 3.1 | 6.9 | 6.4 | 4.5 | 4.3 | 5.7 | 7.9 | 4.2 |
| Zero dispersion wavelength, $\lambda_0$, nm | 1318 | 1315 | 1319 | 1316 | 1317 | 1319 | 1314 | 1314 |
| 22 m Cable Cutoff, $\lambda_C$, nm | 1191 | 1259 | 1225 | 1254 | 1255 | 1240 | 1254 | 1256 |
| MACC (MFD at 1310 nm/Cable Cutoff) | 7.63 | 7.29 | 7.5 | 7.3 | 7.3 | 7.4 | 7.3 | 7.3 |
| Macrobend loss 1 × 20 mm mandrel, dB/turn at 1550 nm | 0.27 | 0.15 | 0.25 | 0.19 | 0.18 | 0.23 | 0.18 | 0.18 |
| Macrobend loss 1 × 30 mm mandrel, dB/turn at 1550 nm | 0.002 | 0.003 | 0.004 | 0.003 | 0.003 | 0.003 | 0.003 | 0.0025 |
| Attn at 1550 nm, dB/km | ≤0.17 | ≤0.17 | ≤0.17 | ≤0.17 | ≤0.17 | ≤0.17 | ≤0.17 | ≤0.17 |
| Attn at 1310 nm, dB/km | ≤0.31 | ≤0.31 | ≤0.31 | ≤0.31 | ≤0.31 | ≤0.31 | ≤0.31 | ≤0.31 |

The results from the modeled optical fibers in Table 1 show optical fibers that meet ITU G.652 and G.657A optical performance properties, have very low macrobend and microbending losses and very low attenuation at 1310 and 1550 nm. In these examples, in wt % ($[Cl]_{core}$)/wt % $[F]_{pedestal}$, the ($[Cl]_{core}/[F]_{pedestal}$)≥1. In these examples in wt % ($[Cl]_{core}$/wt % $[F]_{trench}$, the ($[Cl]_{core}/[F]_{trench}$≥1.

Figure 5:
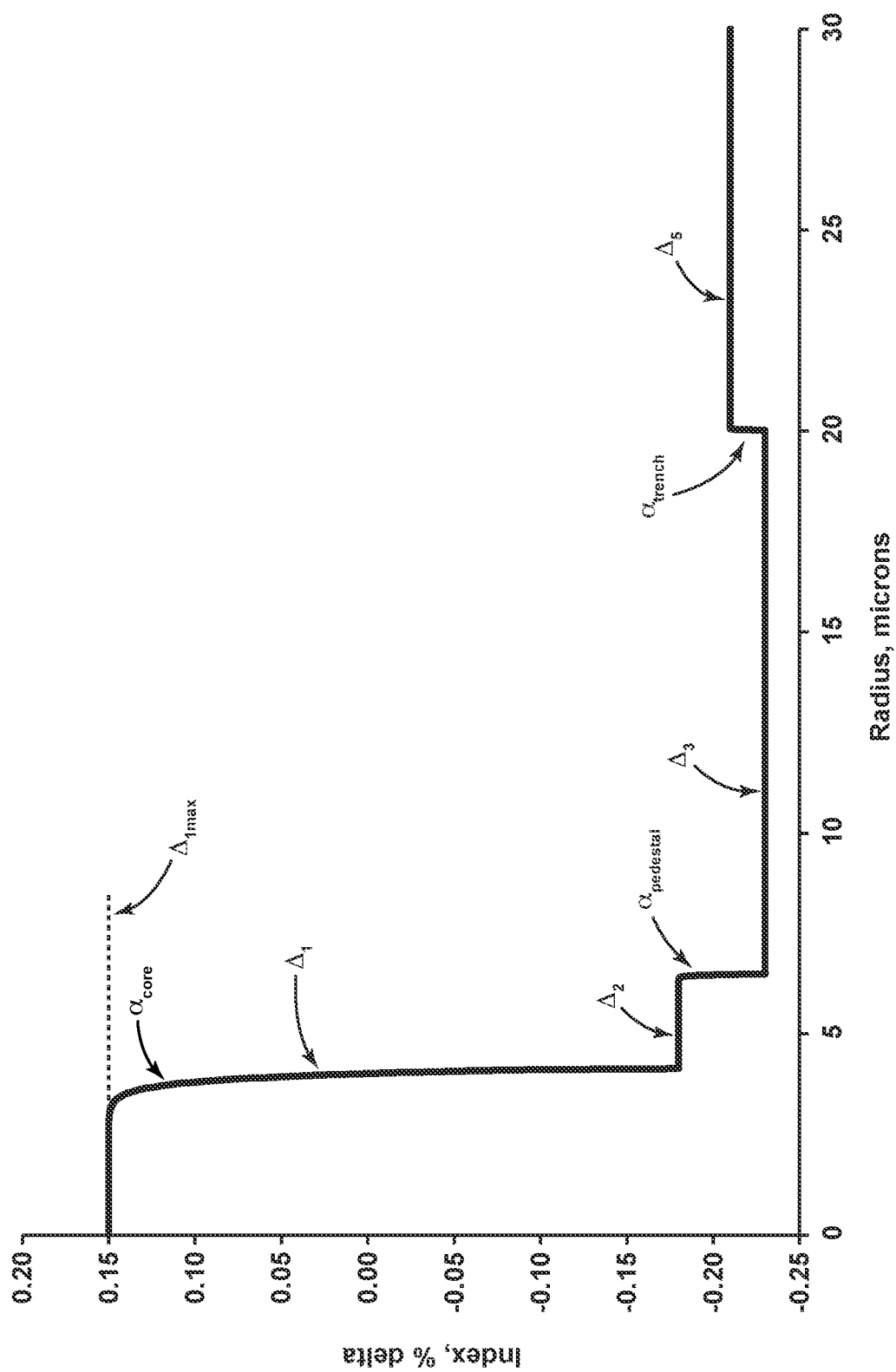
FIGS. 5-14 are profile schematic plots of the relative refractive index profile Δ versus the radius for various optical fibers according to embodiments of the present disclosure.

Referring now to FIG. 5 or Example 1.1, an index profile Δ versus radius r for some embodiments of the optical fiber 10 is represented. The cladding 18 of the pedestal embodiment of optical fiber 10 may include two regions that progress outwardly from the core 14 having the radius $r_1$, refractive index $\Delta_1$, and the refractive index $\Delta_{1max}$ in the following order: the pedestal layer 26 surrounding the core 14 having the radius $r_2$, the alpha pedestal $\alpha_{pedestal}$ and the refractive index $\Delta_2$; the inner cladding layer 30 or trench layer 30a having the radius $r_3$, an alpha trench $\alpha_{trench}$, and the refractive index $\Delta_3$; and the outer cladding layer 34 having the radius $r_4$ (and in this case which is equal to $r_{max}$) and having the refractive index $\Delta_5$. The respective refractive indexes of the core 14 and cladding 18 are $\Delta_{1max} \geq \Delta_2 \geq \Delta_5 \geq \Delta_3$.

Figure 6:
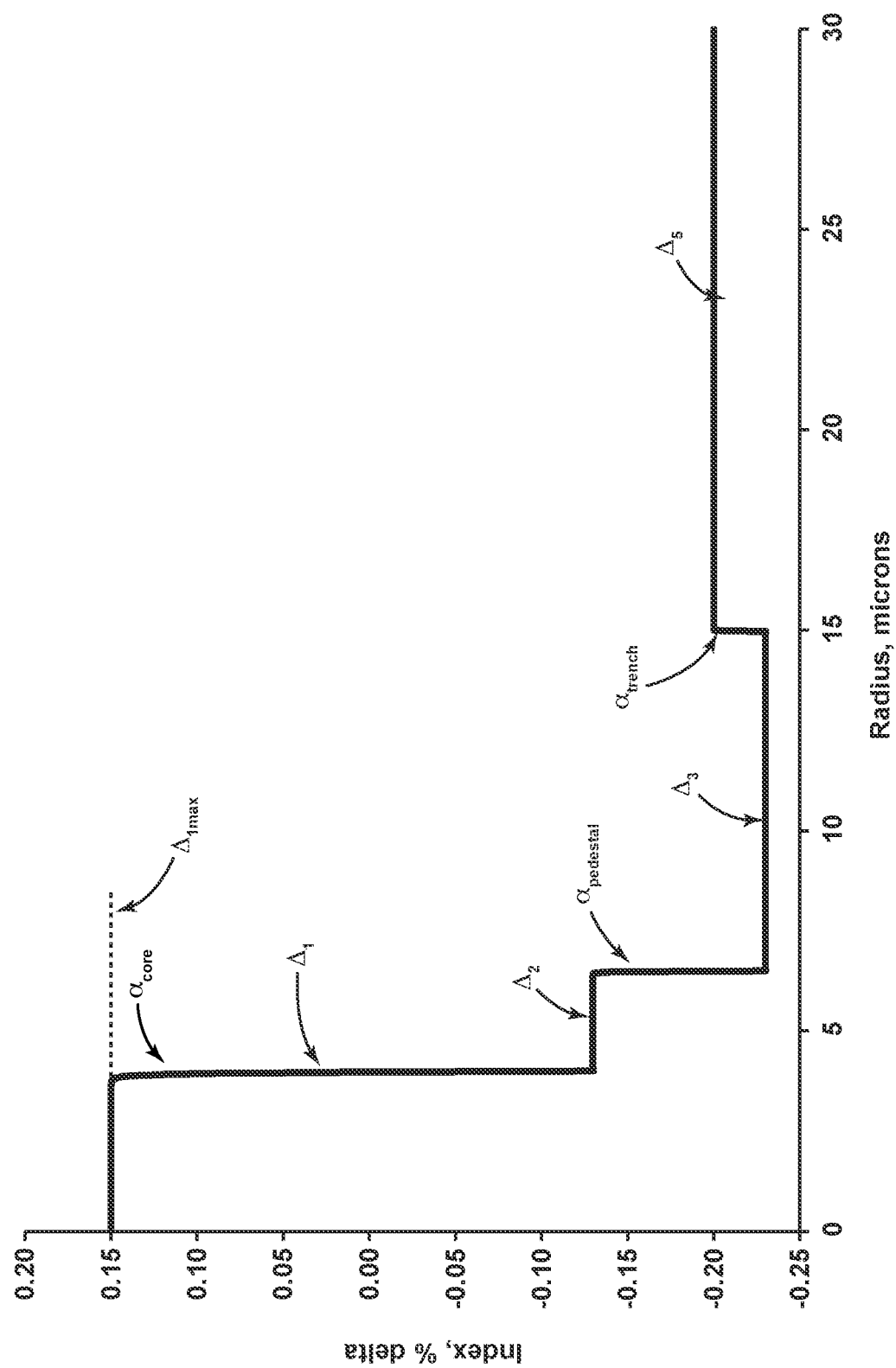
Figure 7:
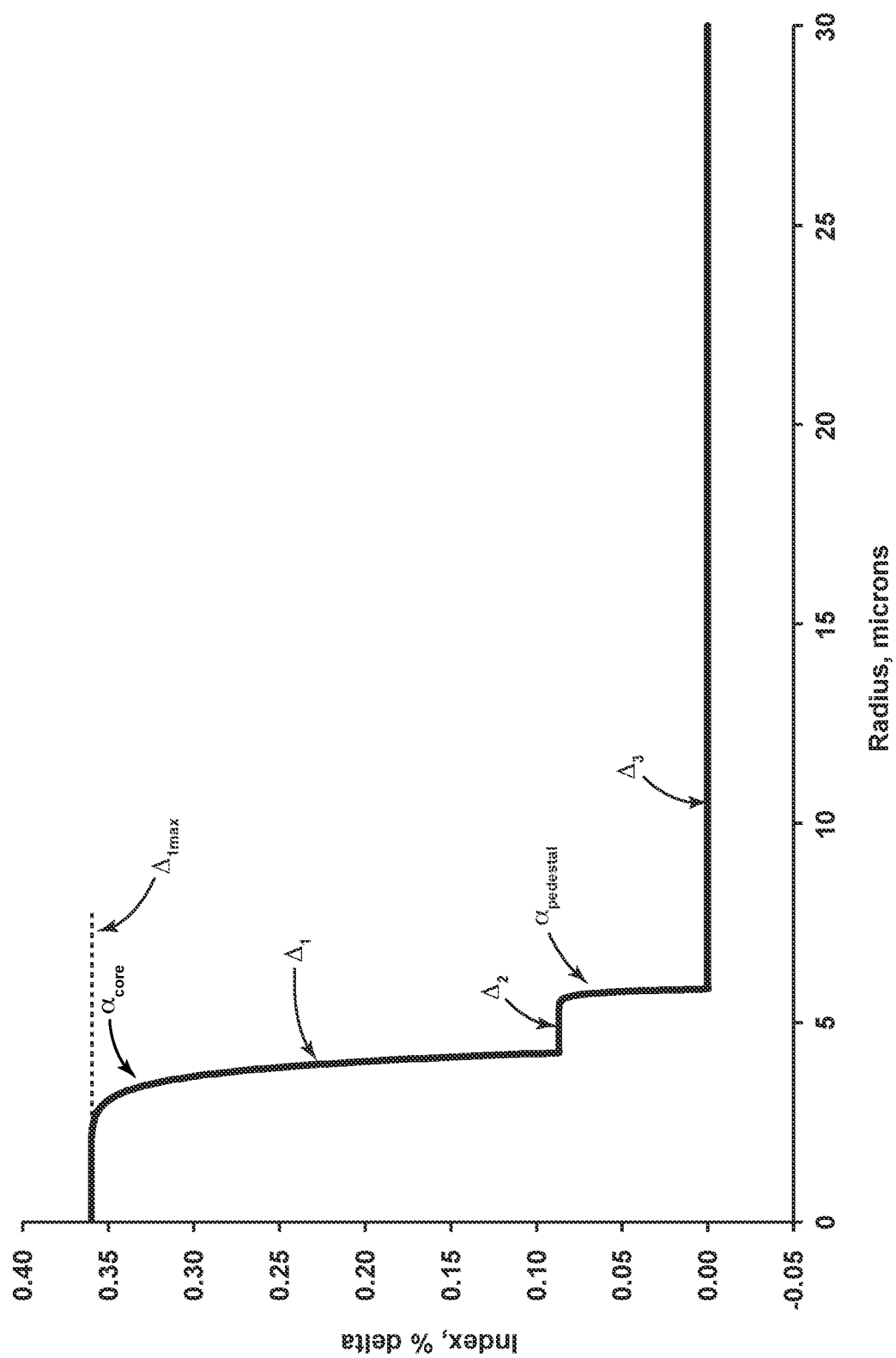
Figure 8:
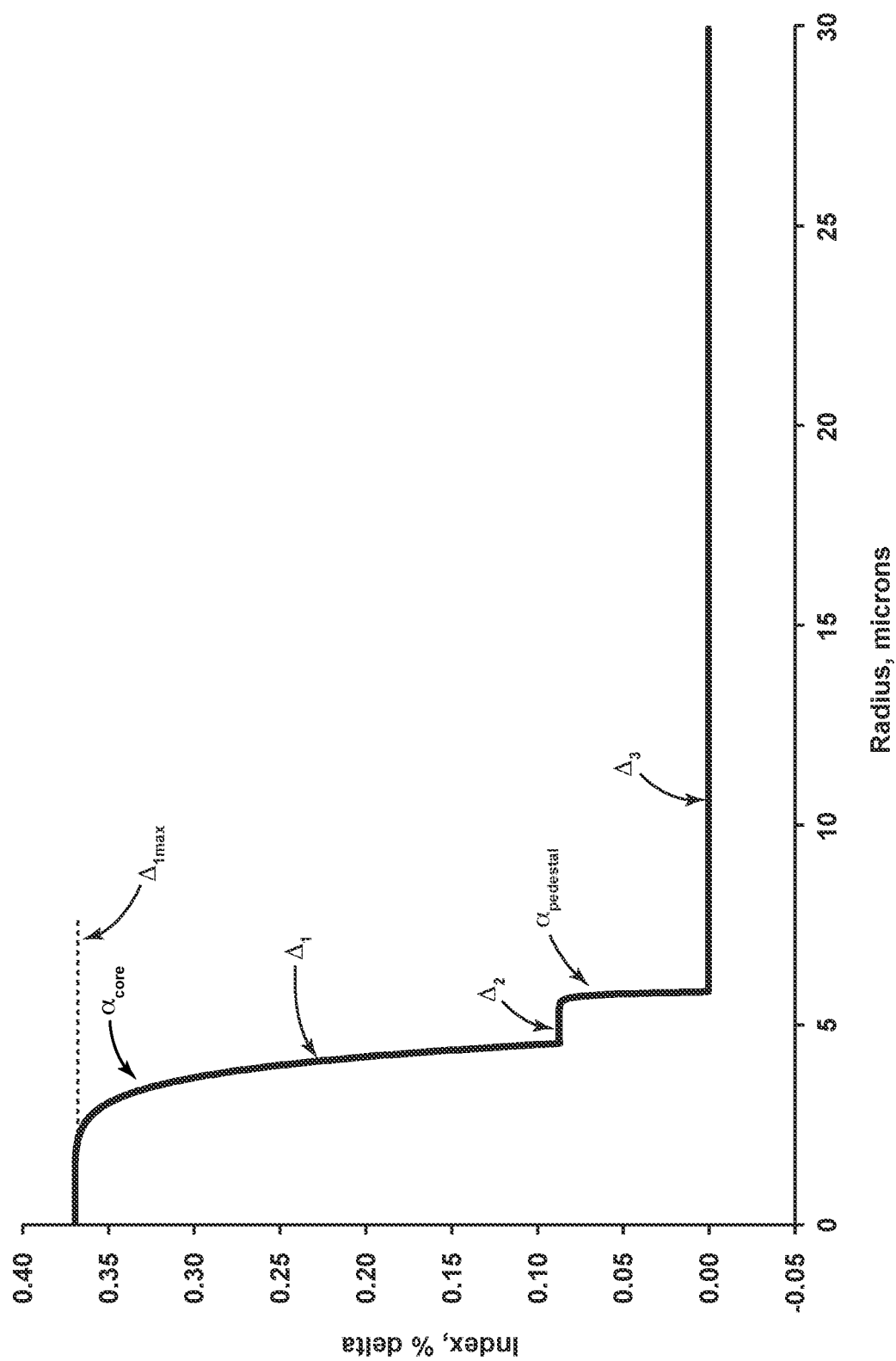
Figure 9:
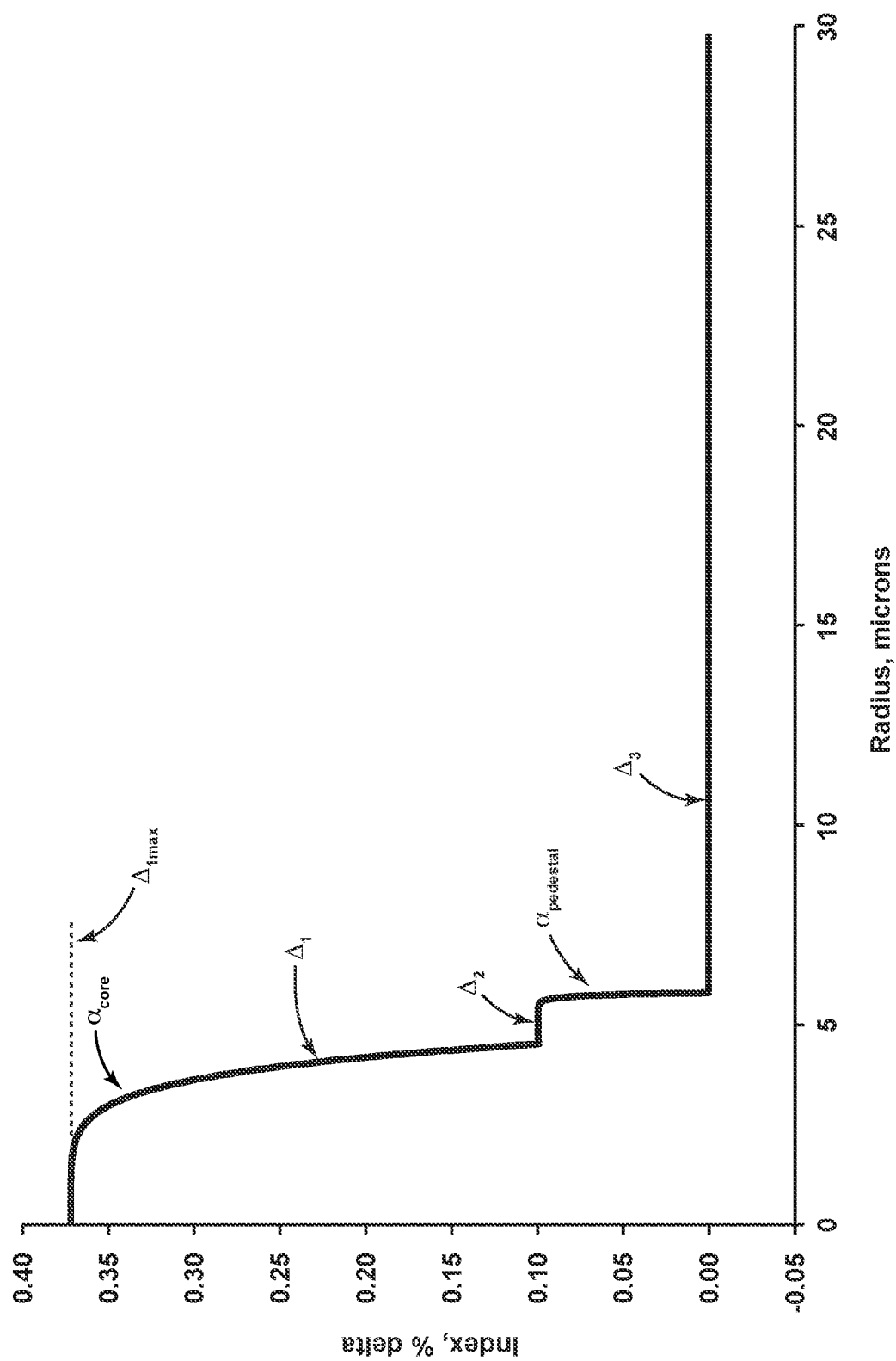
Figure 10:
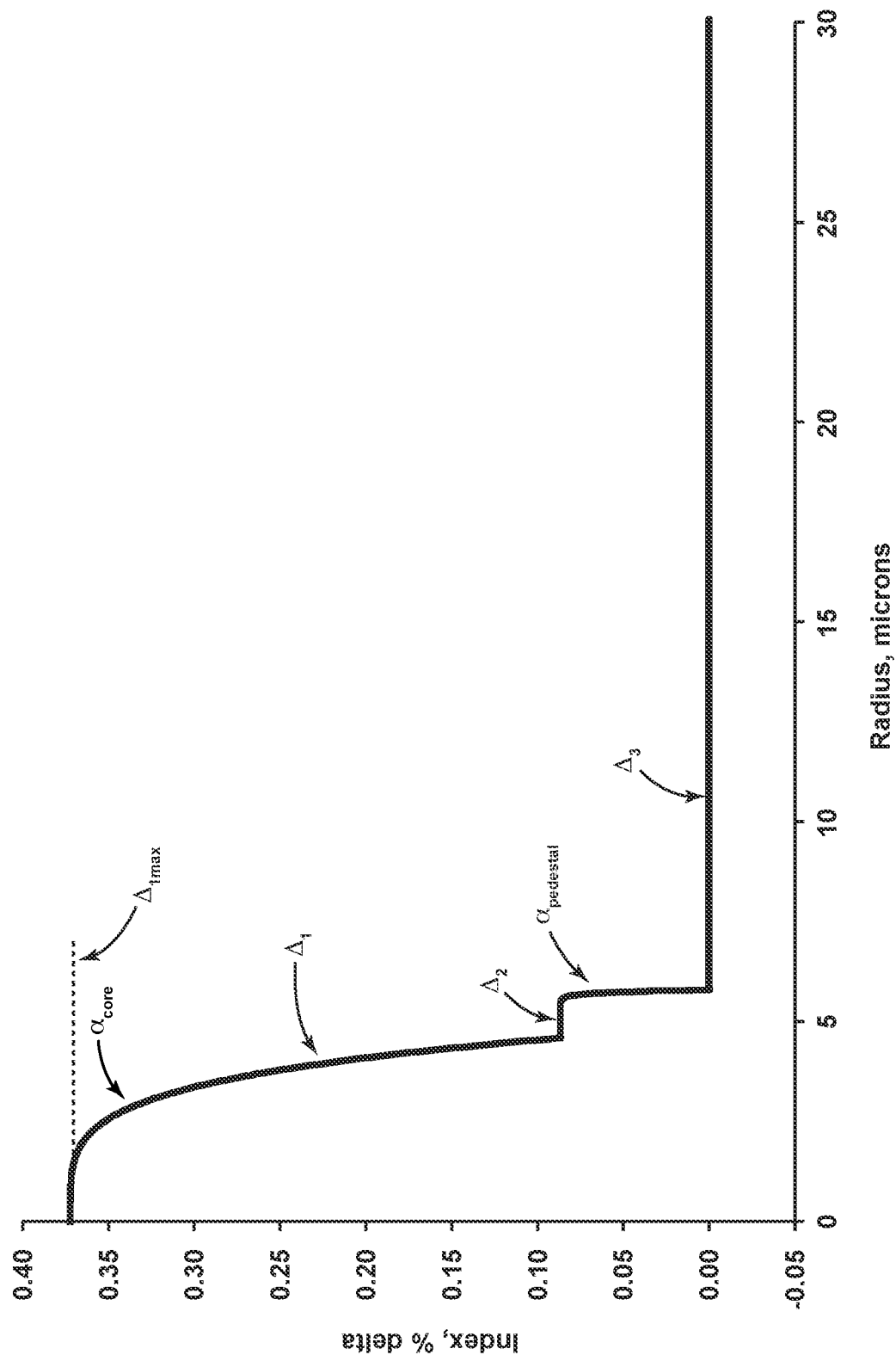

Referring now to FIG. 6 or Example 1.2, an index profile Δ versus radius r for some embodiments of the optical fiber 10 is represented. The cladding 18 of the pedestal embodiment of optical fiber 10 may include two regions that progress outwardly from the core 14 having the radius $r_1$, refractive index $\Delta_1$, and the refractive index $\Delta_{1max}$ in the following order: the pedestal layer 26 surrounding the core 14 having the radius $r_2$, the alpha pedestal $\alpha_{pedestal}$ and the refractive index $\Delta_2$; the inner cladding layer 30 or trench layer 30a having the radius $r_3$, an alpha trench $\alpha_{trench}$, and the refractive index $\Delta_3$; and the outer cladding layer 34 having the radius $r_4$ (and in this case which is equal to $r_{max}$) and having the refractive index $\Delta_5$. The respective refractive indexes of the core 14 and cladding 18 are $\Delta_{1max} \geq \Delta_2 \geq \Delta_5 \geq \Delta_3$.

Referring now to FIGS. 7-10 or Examples 1.3-1.6, an index profile Δ versus radius r for some embodiments of the optical fiber 10 is represented. The cladding 18 of the pedestal embodiment of optical fiber 10 may include two regions that progress outwardly from the core 14 having the radius $r_1$, refractive index $\Delta_1$, and the refractive index $\Delta_{1max}$ in the following order: the pedestal layer 26 surrounding the core 14 having the radius $r_2$, the alpha pedestal $\alpha_{pedestal}$ and the refractive index $\Delta_2$; and the inner cladding layer 30 or trench layer 30a having the radius $r_3$ (and in this case which is equal to $r_{max}$) and the refractive index $\Delta_3$. The respective refractive indexes of the core 14 and cladding 18 are $\Delta_{1max} \geq \Delta_2 \geq \Delta_3$.

Figure 11:
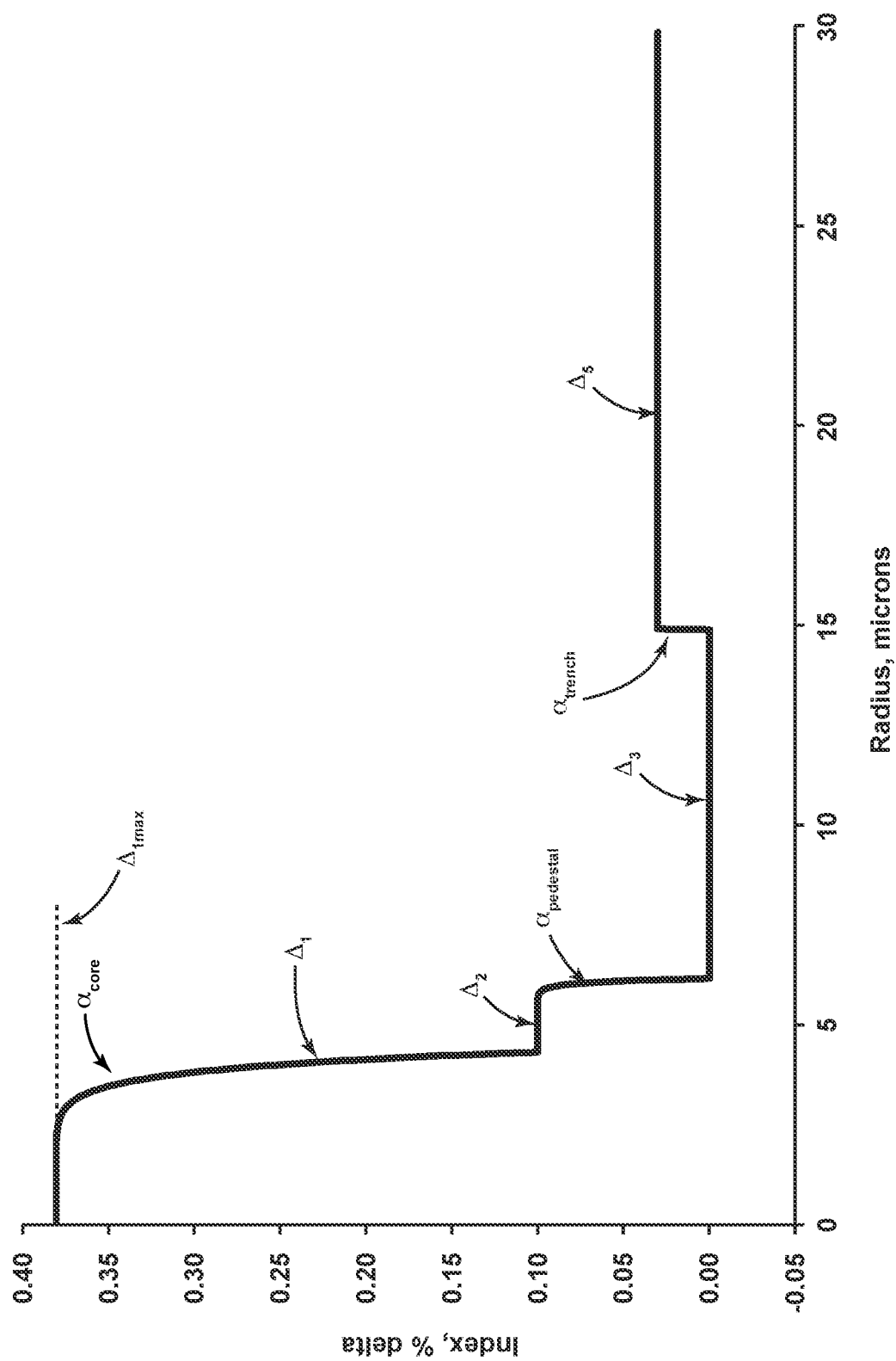

Referring now to FIG. 11 or Example 1.7, an index profile Δ versus radius r for some embodiments of the optical fiber 10 is represented. The cladding 18 of the pedestal embodiment of optical fiber 10 may include two regions that progress outwardly from the core 14 having the radius $r_1$, refractive index $\Delta_1$, and the refractive index $\Delta_{1max}$ in the following order: the pedestal layer 26 surrounding the core 14 having the radius $r_2$, the alpha pedestal $\alpha_{pedestal}$ and the refractive index $\Delta_2$; the inner cladding layer 30 or trench layer 30a having the radius $r_3$, an alpha trench $\alpha_{trench}$, and the refractive index $\Delta_3$; and the outer cladding layer 34 having the radius $r_4$ (and in this case which is equal to $r_{max}$) and having the refractive index $\Delta_5$. The respective refractive indexes of the core 14 and cladding 18 are $\Delta_{1max} \geq \Delta_2 \geq \Delta_5 \geq \Delta_3$.

Figure 12:
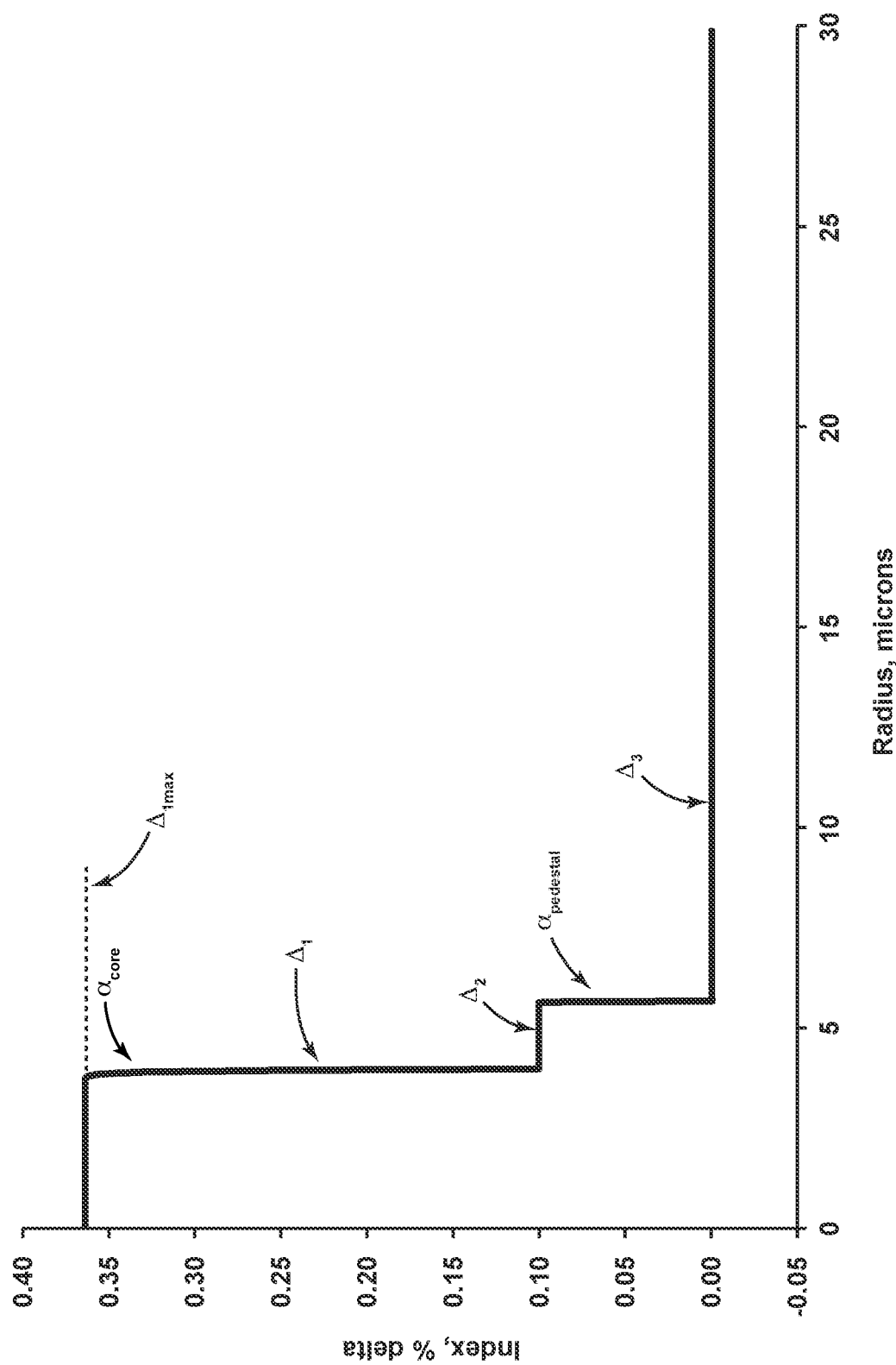

Referring now to FIG. 12 or Example 1.8, an index profile Δ versus radius r for some embodiments of the optical fiber 10 is represented. The cladding 18 of the pedestal embodiment of optical fiber 10 may include two regions that progress outwardly from the core 14 having the radius $r_1$, refractive index $\Delta_1$, and the refractive index $\Delta_{1max}$ in the following order: the pedestal layer 26 surrounding the core 14 having the radius $r_2$, the alpha pedestal $\alpha_{pedestal}$ and the refractive index $\Delta_2$; and the inner cladding layer 30 or trench layer 30a having the radius $r_3$ (and in this case which is equal to $r_{max}$) and the refractive index $\Delta_3$. The respective refractive indexes of the core 14 and cladding 18 are $\Delta_{1max} \geq \Delta_2 \geq \Delta_3$.

Table 2 below sets forth two examples (Ex. 2.1 and Ex. 2.2) of Ring Embodiments used in the optical fiber 10 where the core dopant is chlorine and the ring ($\Delta_2$), as well as $\Delta_3$ and $\Delta_4$ dopant is chlorine.

TABLE 2

| Parameter | Ex. 2.1 | Ex. 2.2 |
|---|---|---|
| Core, $\Delta_{1max}$, % | 0.352 | 0.38 |
| $r_1$, microns | 4.30 | 4.53 |
| Core alpha, $\alpha_{core}$ | 20 | 20 |
| Core dopant | Cl | Cl |
| $\Delta_2$, % | 0.00 | 0.00 |
| $r_2$, microns | 5.33 | 5.48 |
| $\Delta_{3max}$, % | 0.10 | 0.10 |
| $r_3$, microns | 6.28 | 6.55 |
| Ring entry alpha, $\alpha_{3a}$ | 20 | 20 |
| Ring exit alpha, $\alpha_{3b}$ | 20 | 20 |
| Ring dopant | Cl | Cl |
| $\Delta_5$, % | 0.00 | 0.03 |
| $\Delta_5$ dopant | none | Cl |
| $r_{max}$, microns | 62.5 | 62.5 |
| Dispersion at 1310 nm (ps/nm/km) | −0.55 | −0.59 |
| Dispersion Slope at 1310 nm, (ps/nm²/km) | 0.087 | 0.088 |
| Dispersion at 1550 nm, (ps/nm/km) | 16.5 | 16.7 |
| Dispersion at Slope 1550 nm, (ps/nm²/km) | 0.06 | 0.06 |
| MFD at 1310 nm, microns | 9.20 | 9.20 |
| MFD at 1550 nm, microns | 10.5 | 10.5 |
| LLWM at 1550 nm, dB/m | 0.57 | 0.53 |
| WMCD at 1550 nm, dB/km | <0.05 | <0.05 |
| Pin Array at 1550 nm, dB | 8.0 | 7.5 |
| Zero dispersion wavelength, $\lambda_0$, nm | 1316 | 1317 |
| 22 m Cable Cutoff, $\lambda_C$, nm | 1200 | 1205 |
| MACC (MFD at 1310 nm/Cable Cutoff) | 7.67 | 7.63 |
| Macrobend loss 1 × 20 mm mandrel, dB/turn at 1550 nm | 0.41 | 0.33 |
| Macrobend loss 1 × 30 mm mandrel, dB/turn at 1550 nm | 0.005 | 0.004 |
| Attn at 1550 nm, dB/km | ≤0.17 | ≤0.17 |
| Attn at 1310 nm, dB/km | ≤0.31 | ≤0.31 |

The results from the modeled optical fibers in Table 2 show optical fibers that meet ITU G.652 and G.657A optical performance properties, have very low macrobend and microbending losses and very low attenuation at 1310 and 1550 nm.

Figure 13:
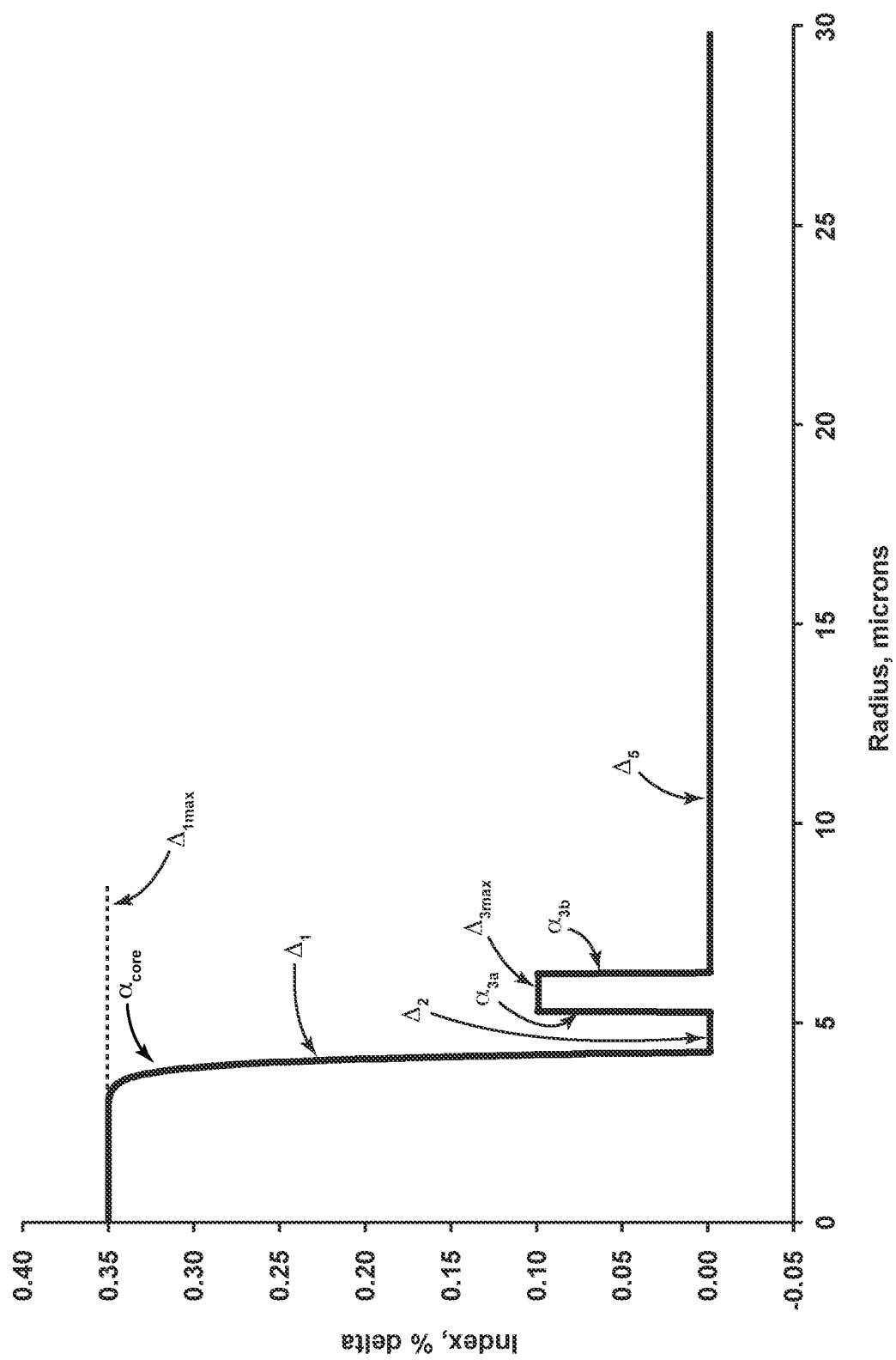

Referring now to FIG. 13 or Example 2.1, an index profile Δ versus radius r for some embodiments of the optical fiber 10 is represented. The cladding 18 of the pedestal embodiments of optical fiber 10 may include two regions that progress outwardly from the core 14 having the radius $r_1$, refractive index $\Delta_1$, and the refractive index $\Delta_{1max}$ in the following order: the pedestal layer 26 surrounding the core 14 having the radius $r_2$ and the refractive index $\Delta_2$; the inner cladding layer 30 or ring layer 30b having the radius $r_3$, the ring entry alpha $\alpha_{3a}$, the ring exit alpha $\alpha_{3b}$, and the refractive index $\Delta_{3max}$; and the outer cladding layer 34 having the radius $r_4$ (and in this case which is equal to $r_{max}$) and having the refractive index $\Delta_5$. The respective refractive indexes of the core 14 and cladding 18 are $\Delta_{1max} \geq \Delta_{3max}$ and $\Delta_5 = \Delta_2$.

Figure 14:
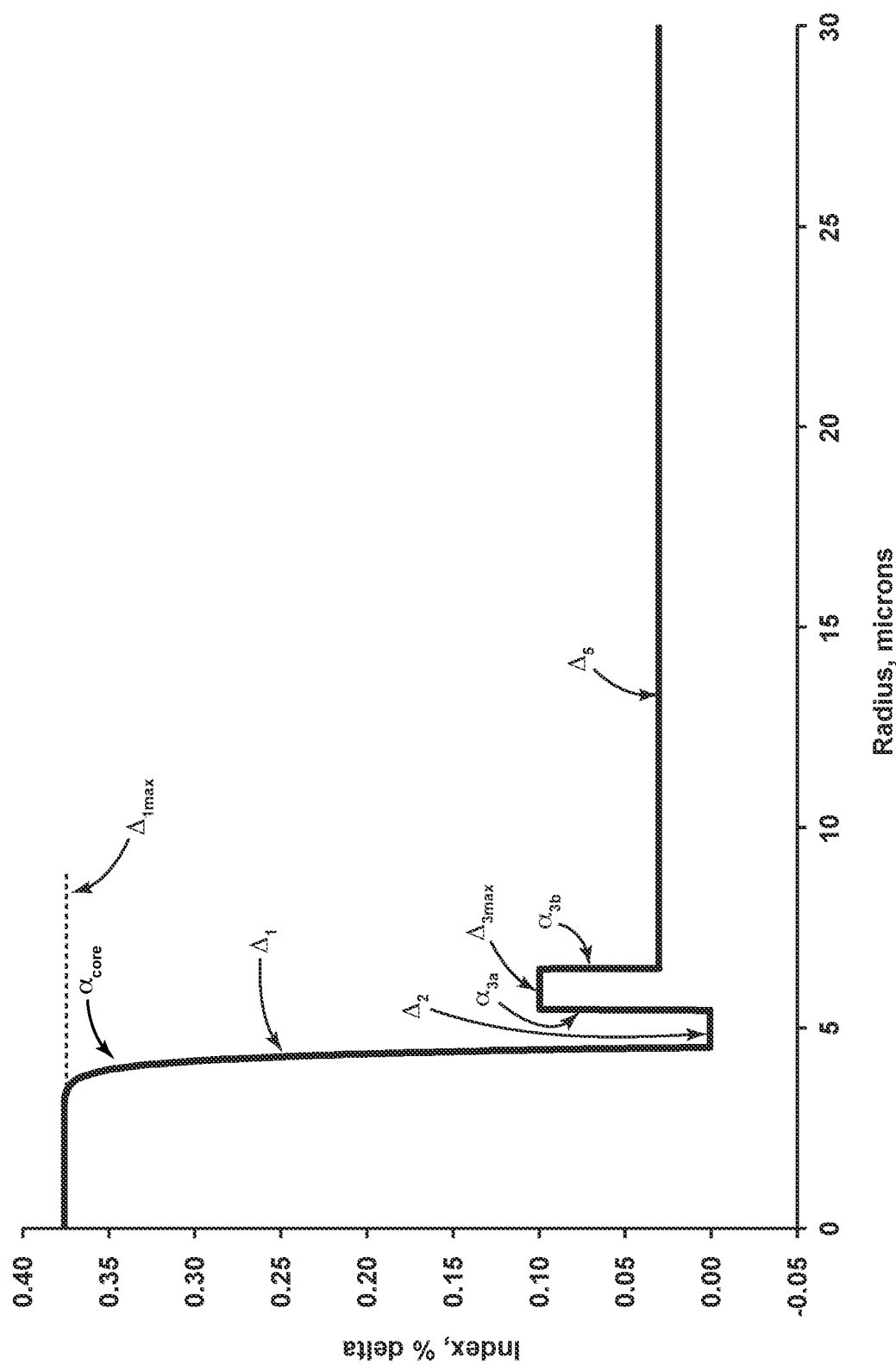

Referring now to FIG. 14 or Example 2.2, an index profile Δ versus radius r for some embodiments of the optical fiber 10 is represented. The cladding 18 of the pedestal embodiments of optical fiber 10 may include two regions that progress outwardly from the core 14 having the radius $r_1$, refractive index $\Delta_1$, and the refractive index $\Delta_{1max}$ in the following order: the pedestal layer 26 surrounding the core 14 having the radius $r_2$ and the refractive index $\Delta_2$; the inner cladding layer 30 or ring layer 30b having the radius $r_3$, the ring entry alpha $\alpha_{3a}$, the ring exit alpha $\alpha_{3b}$, and the refractive index $\Delta_{3max}$; and the outer cladding layer 34 having the radius $r_4$ (and in this case which is equal to $r_{max}$) and having the refractive index $\Delta_5$. The respective refractive indexes of the core 14 and cladding 18 are $\Delta_{1max} \geq \Delta_{3max} \geq \Delta_5 \geq \Delta_2$.

In some embodiments, the $\Delta_{1max}$ ranges from 0.10%≤$\Delta_{1max}$≤0.45%, 0.13%≤$\Delta_{1max}$≤0.39%, 0.14%≤$\Delta_{1max}$≤0.37%, 0.10%≤$\Delta_{1max}$≤0.40%, or 0.13%≤$\Delta_{1max}$≤0.36%. In other embodiments, $\Delta_{1max}$ can be 0.12%, 0.13%, 0.14%, 0.15%, 0.16%, 0.17%, 0.18%, 0.33%, 0.34%, 0.35%, 0.36%, 0.37%, 0.38%, or 0.39%.

In some embodiments, the pedestal radius $r_2$ ranges from 4.5 microns≤$r_2$≤20.5 microns, 4.5 microns≤$r_2$≤7.5 microns, 5.3 microns≤$r_2$≤17.5 microns, 5.3 microns≤$r_2$≤8.0 microns, 5.5 microns≤$r_2$≤20.5 microns, 7.5 microns≤$r_2$≤17.5 microns, 6.0 microns≤$r_2$≤17.5 microns, or 9.0 microns≤$r_2$≤16.0 microns. In other embodiments, $r_2$ can be about 6.0 microns, 6.3 microns, 6.5 microns, 6.8 microns, 7.0 microns, 7.3 microns, 10.0 microns, 12.5 microns, 15.0 microns, 17.5 microns, or 20.5 microns.

In some embodiments, the refractive index $\Delta_2$ ranges from 0%≤$\Delta_2$≤1.0% or 0%≤$\Delta_2$≤0.5%, 0%≤$\Delta_2$≤0.1%. In other embodiments, $\Delta_2$ can be about 0.01%, 0.03%, 0.05%, 0.07%, or 0.09%.

Pedestal volumes are reported in absolute value in units of % delta·microns². In some embodiments, the pedestal volumes are 0.5% delta·microns$^2$≤$V_{pedestal}$≤15% delta·microns$^2$ and in other embodiments, 0.5% delta·microns$^2$≤$V_{pedestal}$≤6% delta·microns$^2$. Trench volumes are reported in absolute value in units of % delta·microns$^2$. In some embodiments, the trench volumes are 1% delta·microns$^2$≤$V_{trench}$≤15% delta·microns$^2$ and in other embodiments, 2% delta·microns$^2$≤$V_{trench}$≤6% delta·microns$^2$.

In some embodiments, the inner cladding or trench radius $r_3$ ranges from 15.0 microns≤$r_3$≤75.0 microns, 15.0 microns≤$r_3$≤65.0 microns, 15.0 microns≤$r_3$≤30.0 microns, or 50.0 microns≤$r_3$≤70.0 microns. In other embodiments, $r_3$ can be about 15.0 microns, 20.0 microns, 25.0 microns, 30.0 microns, 35.0 microns, 40.0 microns, 45.0 microns, 50.0 microns, 55.0 microns, 60.0 microns, 65.0 microns, 7.3 microns, 10.0 microns, 12.5 microns, 15.0 microns, 17.5 microns, or 20.5 microns.

The $\Delta_3$ may include both a $\Delta_{3max}$ and a $\Delta_{3min}$. In some embodiments, the refractive index $\Delta_{3max}$ ranges from −1.5%≤$\Delta_{3max}$≤1.5%, −0.5%≤$\Delta_{3max}$≤0.5%, 0%≤$\Delta_{3max}$≤1.0%, 0%≤$\Delta_{3max}$≤0.5%, or 0%≤$\Delta_{3max}$≤0.05%. In other embodiments, $\Delta_{3max}$ can be about 0%, 0.01%, 0.03%, 0.05%, 0.07%, 0.09%, −0.01%, −0.03%, −0.05%, −0.07%, or −0.09%. In some embodiments, the refractive index $\Delta_{3min}$ ranges from −1.5%≤$\Delta_{3min}$≤1.5%, −0.5%≤$\Delta_{3min}$≤0.5%, 0%≤$\Delta_{3min}$≤1.0%, 0%≤$\Delta_{3min}$≤0.5%, or 0%≤$\Delta_{3min}$≤0.05%. In other embodiments, $\Delta_{3min}$ can be about 0%, 0.01%, 0.03%, 0.05%, 0.07%, 0.09%, −0.01%, −0.03%, −0.05%, −0.07%, or −0.09%.

In other embodiments, the $r_{max}$ can be about 62.5 microns. In some embodiments, the refractive index $\Delta_5$ ranges from −1.5%≤$\Delta_5$≤1.5%, −0.5%≤$\Delta_5$≤0.5%, 0%≤$\Delta_5$≤1.0%, 0%≤$\Delta_5$≤0.5%, or 0%≤$\Delta_5$≤0.05%. In other embodiments, $\Delta_5$ can be about 0%, 0.01%, 0.03%, 0.05%, 0.07%, 0.09%, 0.10%, 0.15%, 0.20%, 0.25%, −0.01%, −0.03%, −0.05%, −0.07%, −0.09%, −0.10%, −0.15%, −0.20, or −0.25%.

In some embodiments, the optical fiber 10 has a macrobending loss at 1550 nm of ≤0.75 dB/turn on a 20 mm diameter mandrel. In other embodiments, the optical fiber 10 has a macrobending loss at 1550 nm of 0.5 dB/turn on a 20 mm diameter mandrel. In still other embodiments, the optical fiber 10 has a macrobending loss at 1550 nm of ≤0.05 dB/turn on a 30 mm diameter mandrel. In additional embodiments, the optical fiber 10 has a macrobending loss at 1550 nm of ≤0.005 dB/turn on a 30 mm diameter mandrel.

In some embodiments, the optical fiber 10 may exhibit the wire mesh covered drum microbend loss, WMCD, at 1550 nm is ≤0.1 dB/km, In other embodiments, the wire mesh covered drum microbend loss, WMCD, at 1550 nm is ≤0.05 dB/km.

In some embodiments, the attenuation at 1550 nm can be ≤0.19 dB/km for the pedestal embodiments. In other embodiments, the attenuation at 1550 nm can be ≤0.18 dB/km for the pedestal embodiments. In still other embodiments, the attenuation at 1550 nm can be ≤0.17 dB/km for the pedestal embodiments.

In some embodiments, the attenuation at 1310 nm can be ≤0.33 dB/km for the pedestal embodiments. In other embodiments, the attenuation at 1310 nm can be ≤0.32 dB/km for the pedestal embodiments. In still other embodiments, the attenuation at 1310 nm can be ≤0.31 dB/km for the pedestal embodiments.

In some embodiments, the attenuation at 1550 nm can be ≤0.19 dB/km for the ring embodiments. In other embodiments, the attenuation at 1550 nm can be ≤0.18 dB/km for the ring embodiments. In still other embodiments, the attenuation at 1550 nm can be ≤0.17 dB/km for the ring embodiments.

In some embodiments, the attenuation at 1310 nm can be ≤0.33 dB/km for the ring embodiments. In other embodiments, the attenuation at 1310 nm can be ≤0.32 dB/km for the ring embodiments. In still other embodiments, the attenuation at 1310 nm can be ≤0.31 dB/km for the ring embodiments.

In some embodiments the optical fiber 10 has a zero dispersion wavelength, $\lambda_0$, and 1300 nm≤$\lambda_0$≤1324 nm.

In some embodiments, the optical fiber 10 exhibits a mode field diameter at 1310 nm ($MDF_{1310\ nm}$) of 8.2≤$MDF_{1310\ nm}$≤9.6 microns. In other embodiments, the optical fiber 10 exhibits a mode field diameter at 1310 nm of 9.0 microns≤$MDF_{1310\ nm}$≤9.5 microns.

Referring now to FIG. 4, a plot or profile schematic of the relative refractive index profile ("index profile") $\Delta$ versus radius r for some aspects of the optical fiber 10 represented in FIG. 2. The optical fiber 10 represented by FIG. 4 include the chlorine doped core 14 with a gradual transition in refractive index between $\Delta_3$ and $\Delta_5$. In some embodiments, the respective refractive indexes of the core 14 and cladding 18 are $\Delta_{1max}$≥$\Delta_5$≥$\Delta_2$≥$\Delta_{3min}$.

The core and cladding of the present coated fibers may be produced in a single-step operation or multi-step operation by methods which are well known in the art. Suitable methods include: the double crucible method, rod-in-tube procedures, and doped deposited silica processes, also commonly referred to as chemical vapor deposition ("CVD") or vapor phase oxidation. A variety of CVD processes are known and are suitable for producing the core and cladding layer used in the coated optical fibers disclosed herein. They include external CVD processes, axial vapor deposition processes, modified CVD (MCVD), inside vapor deposition, and plasma-enhanced CVD (PECVD).

The glass portion of the coated fibers may be drawn from a specially prepared, cylindrical preform which has been locally and symmetrically heated to a temperature sufficient to soften the glass, e.g., a temperature of about 2000° C. for a silica glass. As the preform is heated, such as by feeding the preform into and through a furnace, a glass fiber is drawn from the molten material. See, for example, U.S. Pat. Nos. 7,565,820; 5,410,567; 7,832,675; and 6,027,062; the disclosures of which are hereby incorporated by reference herein, for further details about fiber making processes.

The optical fibers 10 described in the pedestal and trench chlorine embodiments herein may include one or more coatings positioned between the chlorine doped silica central core 14 region and the one or more layers of cladding 18. In some embodiments, there is a primary coating in contact with the outer radius of the chlorine doped silica central core 14 region and a secondary coating in contact with the outer radius of the primary coating.

The primary coating may be formed from a curable composition that includes an oligomer and a monomer. The oligomer may be a urethane acrylate or a urethane acrylate with acrylate substitutions. The urethane acrylate with acrylate substitutions may be a urethane methacrylate. The oligomer may include urethane groups. The oligomer may be a urethane acrylate that includes one or more urethane groups. The oligomer may be a urethane acrylate with acrylate substitutions that includes one or more urethane groups. Urethane groups may be formed as a reaction product of an isocyanate group and an alcohol group.

The primary coating may have an in situ modulus of elasticity of 1 MPa or less, 0.50 MPa or less, 0.25 MPa or less, 0.20 MPa or less, 0.19 MPa or less, 0.18 MPa or less, 0.17 MPa or less, 0.16 MPa or less, or 0.15 MPa or less. The glass transition temperature of the primary coating may be −15° C. or less, −25° C. or less, −30° C. or less, or −40° C. or less.

The secondary coating may be formed from a curable secondary composition that includes one or more monomers. The one or more monomers may include bisphenol-A diacrylate, or a substituted bisphenol-A diacrylate, or an alkoxylated bisphenol-A diacrylate. The alkoxylated bisphenol-A diacrylate may be an ethoxylated bisphenol-A diacrylate. The curable secondary composition may further include an oligomer. The oligomer may be a urethane acrylate or a urethane acrylate with acrylate substitutions. The secondary composition may be free of urethane groups, urethane acrylate compounds, urethane oligomers or urethane acrylate oligomers.

The secondary coating may be a material with a higher modulus of elasticity and higher glass transition temperature than the primary coating. The in situ modulus of elasticity of the secondary coating may be 1200 MPa or greater, 1500 MPa or greater, 1800 MPa or greater, 2100 MPa or greater, 2400 MPa or greater, or 2700 MPa or greater. The secondary coating may have an in situ modulus between about 1500 MPa and 10,000 MPa or between 1500 MPa and 5000 MPa. The in situ glass transition temperature of the secondary coating may be at least 50° C., at least 55° C., at least 60° C. or between 55° C. and 65° C.

The radius of the coated fibers coincides with the outer diameter of the secondary coating. The radius of the coated fiber may be 125 μm or less, 110 μm or less, 105 μm or less, or 100 μm or less. In some embodiments, the coated optical fiber diameter is 150 microns≤coated optical fiber diameter≤210 microns. Within the coated fiber, the glass radius (coinciding with the outer diameter of the cladding) may be at least 50 μm, at least 55 μm, at least 60 μm, or at least 62.5 μm. The chlorine doped silica central core 14 region may be surrounded by the primary coating. The outer radius of the primary coating may be 85 μm or less, 82.5 μm or less, 80 μm or less, 77.5 μm or less, or 75 μm or less. The balance of the coated fiber diameter is provided by the secondary coating.

It will be apparent to those skilled in the art that various modifications and variations can be made without departing from the spirit or scope of the claims.

List of Non-Limiting Embodiments

Embodiment A is a single mode optical fiber comprising: (i) a chlorine doped silica based core comprising a core alpha (Core$_\alpha$)≥4, a radius $r_1$ and a maximum refractive index delta $\Delta_{1max}$; (ii) a cladding surrounding the core, the cladding comprising: a. a first inner cladding region adjacent to and in contact with the core and having a refractive index delta $\Delta_2$, a radius $r_2$, and a minimum refractive index delta $\Delta_{2min}$ such that $\Delta_{2min}<\Delta_{1max}$; and b. an outer cladding region surrounding the second inner cladding region and having a refractive index $\Delta_5$ and a radius $r_{max}$, such that $\Delta_{2min}\geq\Delta_5$. The optical fiber has a mode field diameter MFD at 1310 of ≥9 microns, a cable cutoff of ≤1260 nm, a zero dispersion wavelength ranging from 1300 nm≤$\lambda_0$≤1324 nm, and a macrobending loss at 1550 nm for a 20 mm mandrel of less than 0.75 dB/turn.

The single mode optical fiber of Embodiment A further comprising a second inner cladding adjacent to and in contact with the first inner cladding and having a refractive index $\Delta_3$, a radius $r_3$, and a minimum refractive index delta $\Delta_{3min}$ such that $\Delta_{3min}\leq\Delta_2$.

The single mode optical fiber of Embodiment A or Embodiment A with any of the intervening features wherein the outer cladding region surrounding the second inner cladding region has a refractive index $\Delta_5$ and a radius $r_{max}$, such that $\Delta_{3min}\leq\Delta_5$.

The single mode optical fiber of Embodiment A or Embodiment A with any of the intervening features further comprising a chlorine concentration in the core of ≥1.5 wt %.

The single mode optical fiber of Embodiment A or Embodiment A with any of the intervening features wherein the macrobending loss at 1550 nm is ≤0.5 dB/turn on a 20 mm diameter mandrel.

The single mode optical fiber of Embodiment A or Embodiment A with any of the intervening features wherein the maximum refractive index $\Delta_{1max}$ ranges from 0.10%≤$\Delta_{1max}$≤0.45%.

The single mode optical fiber of Embodiment A or Embodiment A with any of the intervening features wherein the minimum refractive index $\Delta_{3min}$ is −0.5%≤$\Delta_{3min}$≤0.25%.

The single mode optical fiber of Embodiment A or Embodiment A with any of the intervening features wherein the minimum refractive index $\Delta_{3min}$ is −0.25%≤$\Delta_{3min}$≤0.15%.

The single mode optical fiber of Embodiment A or Embodiment A with any of the intervening features wherein the outer radius $r_3$ is 12.0 microns≤$r_3$≤25.0 microns.

The single mode optical fiber of Embodiment A or Embodiment A with any of the intervening features wherein the macrobending loss exhibited by the optical fiber at 1550 nm is ≤0.70 dB/turn on a 20 mm diameter mandrel and exhibits a MACC number between 7.1 and 8.1.

Embodiment B is a single mode optical fiber comprising: (i) a chlorine doped silica based core comprising a core alpha (Core$_\alpha$)≥4, a radius $r_1$, and a maximum refractive index delta $\Delta_{1max}$; (ii) a cladding surrounding the core, the cladding comprising: a. a first inner cladding region adjacent to and in contact with the core and having a refractive index delta $\Delta_2$, a radius $r_2$, and a minimum refractive index delta $\Delta_{2min}$ such that $\Delta_{2min}<\Delta_{1max}$; b. a second inner cladding adjacent to and in contact with the first inner cladding and having a refractive index $\Delta_3$, a radius $r_3$, and a maximum refractive index delta $\Delta_{3max}$ such that $\Delta_{2min}<\Delta_{3max}$; and c. an outer cladding region surrounding the second inner cladding region and having a refractive index $\Delta_5$ and a radius $r_{max}$, such that $\Delta_5\leq\Delta_{3max}$. The optical fiber has a mode field diameter MFD at 1310 of ≥9 microns, a cable cutoff of ≤1260 nm, a zero dispersion wavelength ranging from 1300 nm≤$\lambda_0$≤1324 nm, and a macrobending loss at 1550 nm for a 20 mm mandrel of less than 0.75 dB/turn.

The single mode optical fiber of Embodiment B further comprising a chlorine concentration in the core of ≥1.5 wt %.

The single mode optical fiber of Embodiment B or Embodiment B with any of the intervening features wherein the macrobending loss at 1550 nm is ≤0.5 dB/turn on a 20 mm diameter mandrel.

The single mode optical fiber of Embodiment B or Embodiment B with any of the intervening features wherein the macrobending loss at 1550 nm of ≤0.005 dB/turn on a 30 mm diameter mandrel.

The single mode optical fiber of Embodiment B or Embodiment B with any of the intervening features wherein the maximum refractive index $\Delta_{1max}$ ranges from $0.10\% \le \Delta_{1max} \le 0.45\%$.

The single mode optical fiber of Embodiment B or Embodiment B with any of the intervening features wherein $Core_\alpha \ge 15$.

The single mode optical fiber of Embodiment B or Embodiment B with any of the intervening features wherein the maximum refractive index $\Delta_{3max}$ is $-0.5\% \le \Delta_{3min} \le 0.25\%$.

The single mode optical fiber of Embodiment B or Embodiment B with any of the intervening features wherein the outer radius $r_3$ is 15.0 microns $\le r_3 \le$ 15.0 microns.

The single mode optical fiber of Embodiment B or Embodiment B with any of the intervening features wherein the macrobending loss exhibited by the optical fiber at 1550 nm is ≤0.70 dB/turn on a 20 mm diameter mandrel and exhibits a MACC number between 7.1 and 8.1.

The single mode optical fiber of Embodiment B or Embodiment B with any of the intervening features wherein the optical fiber has a wire mesh covered drum microbend loss, (WMCD) at 1550 nm of ≤0.1 dB/km.

What is claimed is:

1. A single mode optical fiber comprising:
   (i) a chlorine doped silica based core comprising a core alpha ($Core_\alpha$)≥4, a radius $r_1$, and a maximum refractive index delta $\Delta_{1max}$;
   (ii) a cladding surrounding the core, the cladding comprising:
      a. a first inner cladding region adjacent to and in contact with the core and having a refractive index delta $\Delta_2$, a radius $r_2$, and a minimum refractive index delta $\Delta_{2min}$ such that $\Delta_{2min} < \Delta_{1max}$;
      b. a second inner cladding region adjacent to and in contact with the first inner cladding and having a refractive index $\Delta_3$, a radius $r_3$, and a maximum refractive index delta $\Delta_{3max}$ such that $\Delta_{2min} < \Delta_{3max}$; and
      c. an outer cladding region surrounding the second inner cladding region and having a refractive index $\Delta_5$ and a radius $r_{max}$, such that $\Delta_5 < \Delta_{3max}$;
   wherein the optical fiber has a mode field diameter MFD at 1310 nm of ≥9 microns, a cable cutoff of ≤1260 nm, a zero dispersion wavelength ranging from 1300 nm≤$\lambda_0$≤1324 nm, and a macrobending loss at 1550 nm for a 20 mm mandrel of less than 0.75 dB/turn, and wherein the refractive index of the outer cladding $\Delta_5$ and the refractive index of the first inner cladding region $\Delta_{2min}$ is such that $\Delta_5 > \Delta_{2min}$.

2. The single mode optical fiber of claim 1, further comprising a chlorine concentration in the core of ≥1.5 wt %.

3. The single mode optical fiber of claim 1, wherein the macrobending loss at 1550 nm is ≤0.5 dB/turn on a 20 mm diameter mandrel.

4. The single mode optical fiber of claim 1, wherein the macrobending loss at 1550 nm of ≤0.005 dB/turn on a 30 mm diameter mandrel.

5. The single mode optical fiber of claim 1, wherein the maximum refractive index $\Delta_{1max}$ ranges from $0.10\% \le \Delta_{1max} \le 0.45\%$.

6. The single mode optical fiber of claim 1, wherein $Core_\alpha \ge 15$.

7. The single mode optical fiber of claim 1, wherein the maximum refractive index $\Delta_{3max}$ is $-0.5\% \le \Delta_{3min} \le 0.25\%$.

8. The single mode optical fiber of claim 1, wherein the outer radius $r_3$ is 15.0 microns $\le r_3 \le$ 75.0 microns.

9. The single mode optical fiber of claim 1, wherein the macrobending loss exhibited by the optical fiber at 1550 nm is ≤0.70 dB/turn on a 20 mm diameter mandrel and exhibits a MACC number between 7.1 and 8.1.

10. The single mode optical fiber of claim 1, wherein the optical fiber has a wire mesh covered drum microbend loss, (WMCD) at 1550 nm of ≤0.1 dB/km.

* * * * *

UNITED STATES PATENT AND TRADEMARK OFFICE
CERTIFICATE OF CORRECTION

| | | |
|---|---|---|
| PATENT NO. | : 11,125,938 B2 | Page 1 of 1 |
| APPLICATION NO. | : 16/741993 | |
| DATED | : September 21, 2021 | |
| INVENTOR(S) | : Dana Craig Bookbinder et al. | |

It is certified that error appears in the above-identified patent and that said Letters Patent is hereby corrected as shown below:

On the Title Page

In Column 1, below "Pat. No. 10,591,668. (continued)" insert -- (30) Foreign Application Priority Data Oct. 27, 2017 (NL)..................2019817 --.

In the Claims

In Column 20, Line 11 (approx.), Claim 1, delete "$\Delta_5 > \Delta_{2min}$." and insert -- $\Delta_5 \geq \Delta_{2min}$. --, therefor.

Signed and Sealed this
Twelfth Day of December, 2023

Katherine Kelly Vidal
*Director of the United States Patent and Trademark Office*